US008041747B2

(12) United States Patent
Nishihashi et al.

(10) Patent No.: US 8,041,747 B2
(45) Date of Patent: Oct. 18, 2011

(54) DATA SEARCH DEVICE AND GATEWAY DEVICE IN COMMUNICATION APPARATUS

(75) Inventors: Susumu Nishihashi, Kobe (JP); Shinji Yamashita, Kobe (JP); Kenji Hontani, Tokyo (JP); Yukio Fujisawa, Tokyo (JP); Satoshi Yamanaka, Tokyo (JP); Hiroaki Shimauchi, Tokyo (JP)

(73) Assignees: Fujitsu Ten Limited, Kobe-Shi (JP); Toyota Jidosha Kabushiki Kaisha, Toyota (JP)

( * ) Notice: Subject to any disclaimer, the term of this patent is extended or adjusted under 35 U.S.C. 154(b) by 262 days.

(21) Appl. No.: 12/379,352

(22) Filed: Feb. 19, 2009

(65) Prior Publication Data

US 2009/0210397 A1    Aug. 20, 2009

(30) Foreign Application Priority Data

Feb. 20, 2008  (JP) ................................. 2008-039432
Feb. 19, 2009  (JP) ................................. 2009-036036

(51) Int. Cl.
G06F 7/10    (2006.01)
G06F 17/30   (2006.01)
(52) U.S. Cl. ...................................................... 707/802
(58) Field of Classification Search .................. 707/802
See application file for complete search history.

(56) References Cited

U.S. PATENT DOCUMENTS 5,121,390 A * 6/1992 Farrell et al. ................. 370/458
5,218,680 A * 6/1993 Farrell et al. ................. 709/215

FOREIGN PATENT DOCUMENTS

| JP | A-07-044431   | 2/1995 |
| JP | A-2000-244548 | 9/2000 |
| JP | A-2005-159568 | 6/2005 |
| JP | A-2007-179479 | 7/2007 |

OTHER PUBLICATIONS

Japanese Office Action issued in Japanese Patent Application No. 2009-036036 on Dec. 8, 2009. (with translation).

* cited by examiner

*Primary Examiner* — Don Wong
*Assistant Examiner* — Belinda Xue
(74) *Attorney, Agent, or Firm* — Oliff & Berridge PLC

(57) ABSTRACT

A data search device that is provided in a communication apparatus detects a memory area storing data to be transmitted from a memory unit having memory areas defined by IDs allotted to data. The data search device includes: a first flag that is provided for each of the memory areas of the memory unit, and indicate whether the data in the corresponding memory area is updated; a second flag that is provided for each group consisting of a predetermined number of the first flags, and indicates a data update state when at least one set of data in the first flags in the corresponding group indicates an updated state; and a search control unit that detects the memory area storing the data to be transmitted, by searching for the corresponding first flag after detecting the second flag.

5 Claims, 17 Drawing Sheets

FIG. 1A
PRIOR ART

| | | ID | DATA | FLAG | |
|---|---|---|---|---|---|
| FIRST-TIME SEARCH | 0 | 001 | 4587 | 0 | |
| | 1 | 010 | 4193 | 0 | |
| | 2 | 050 | 8987 | 0 | |
| | 3 | 111 | 5371 | 0 | |
| | 4 | 125 | 8695 | 0 | |
| | 5 | 168 | 1032 | 0 | |
| | 6 | 192 | 7894 | 1 | ⇒ TO TRANSMITTING MESSAGE BOX |
| SECOND-TIME SEARCH | 7 | 216 | 1036 | 0 | |
| | 8 | 239 | 7892 | 0 | |
| | 9 | 268 | 1523 | 0 | |
| | 10 | 318 | 8642 | 0 | |
| | 11 | 328 | 5571 | 0 | |
| | 12 | 356 | 9542 | 0 | |
| | 13 | 410 | 3657 | 1 | ⇒ TO TRANSMITTING MESSAGE BOX |
| THIRD-TIME SEARCH | 14 | 418 | 9512 | 0 | |
| | ... | ... | ... | ... | |
| RETURN TO THE TOP | 99 | 777 | 7423 | 0 | |

FIG. 1B
PRIOR ART

| | | ID | DATA | FLAG |
|---|---|---|---|---|
| | 0 | 001 | 4587 | 0 |
| | 1 | 010 | 4193 | 0 |
| | 2 | 050 | 8987 | 0 |
| | 3 | 111 | 5371 | 0 |
| | 4 | 125 | 8695 | 0 |
| | 5 | 168 | 1032 | 0 |
| | 6 | 192 | 7894 | 0 |
| 100 SEARCHES | 7 | 216 | 1036 | 0 |
| | 8 | 239 | 7892 | 0 |
| | 9 | 268 | 1523 | 0 |
| | 10 | 318 | 8642 | 0 |
| | 11 | 328 | 5571 | 0 |
| | 12 | 356 | 9542 | 0 |
| | 13 | 410 | 3657 | 0 |
| | 14 | 418 | 9512 | 0 |
| | ... | ... | ... | ... |
| | 99 | 777 | 7423 | 0 |

FIG. 6

| ADDRESS | Par1 (1BIT) | IDE (1BIT) | RTR (1BIT) | ID (29BIT) | PAR2 (1BIT) | FIFO (1BIT) | TxCH (6BIT) | LABEL1 (8BIT) | LABEL0 (2BIT) | RxCH (6BIT) | MASKINFO (8BIT) |
|---|---|---|---|---|---|---|---|---|---|---|---|
| ENTRY 1 0x000+000 | * | 0 | 0 | 0x00000001 | * | 1 | 111111b | 0x00 | 00b | 111110b | 0x00 |
| ENTRY 2 0x000+008 | * | 0 | 0 | 0x00000002 | * | 1 | 001111b | 0x01 | 00b | 110000b | 0x00 |
| ENTRY 3 0x000+010 | * | 0 | 0 | 0x00000010 | * | 1 | 000001b | 0x02 | 01b | 000010b | 0x00 |
| ... | ... | ... | ... | ... | ... | ... | ... | ... | ... | ... | ... |

KEY FIELD: IDE, RTR, AND ID

PAR1: PARITIES FOR IED, RTR, AND ID
PAR2: PARITIES FOR FIFOS THROUGH MASKINFO

FIFO: FIFO NUMBER
TxCH: DATA INDICATING WHETHER CHANNELS 1 THROUGH 6 ARE RELAY DESTINATIONS FOR EACH BIT
TxCH: DATA INDICATING WHETHER CHANNELS 1 THROUGH 6 ARE RELAY DESTINATIONS FOR EACH BIT

FIG. 13A
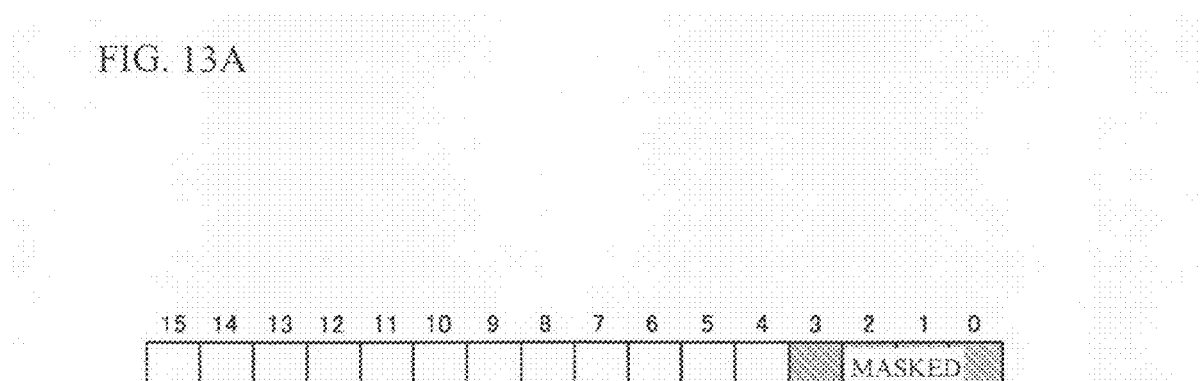
FIG. 13B
FIG. 13C
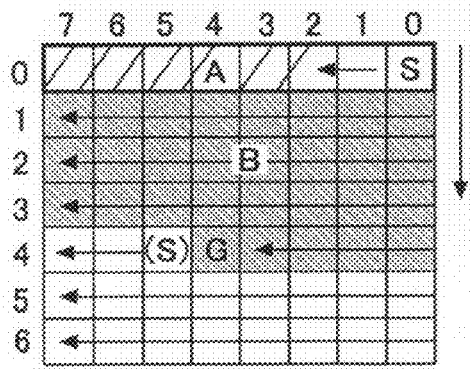
FIG. 13D
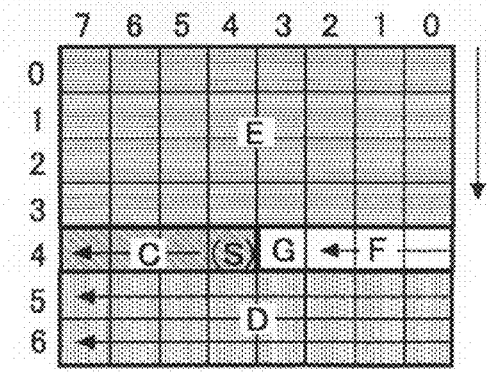

FIG. 16

INFORMATION TO BE WRITTEN INTO TRANSMISSION FIFO

| IDE | RTR | CAN ID | DATA | DLC | TS | LABEL |
|---|---|---|---|---|---|---|
| 1 BIT | 1 BIT | 29BIT | 64BIT | 4BIT | * | * |

*:MORE THAN ONE BIT

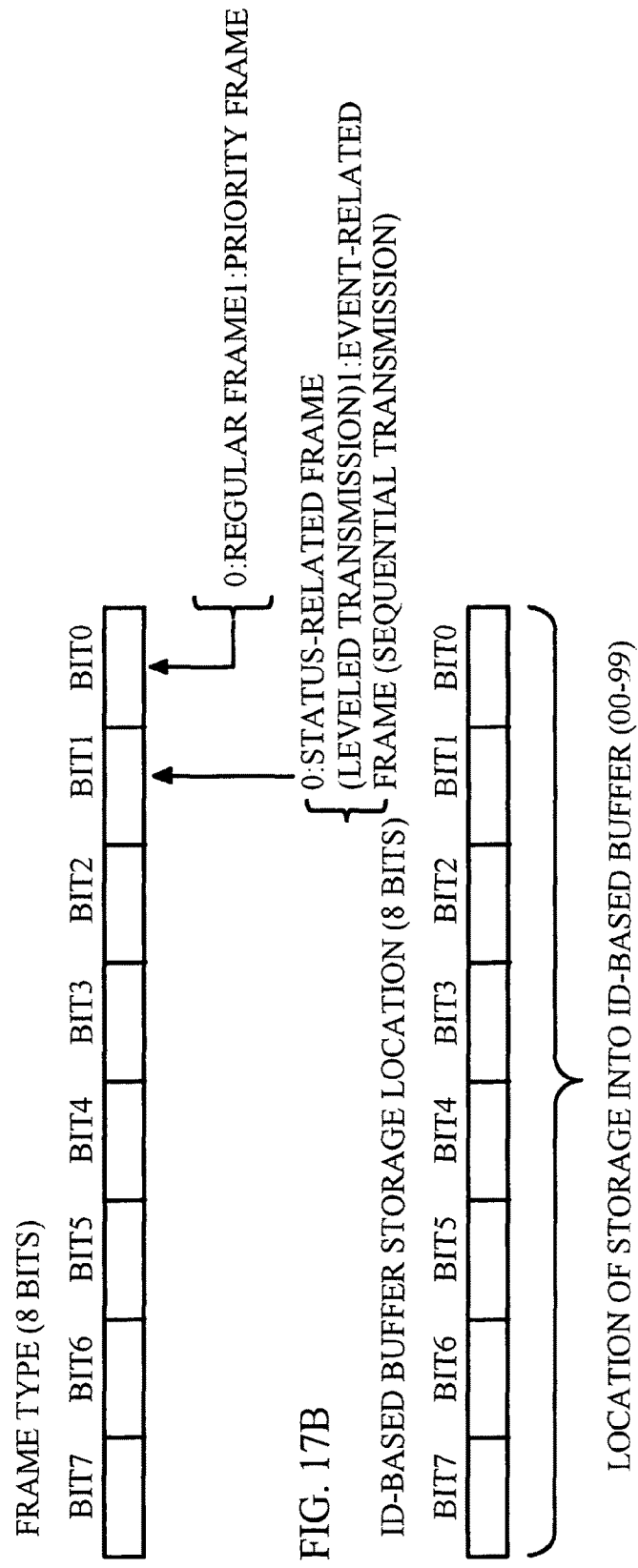

DATA SEARCH DEVICE AND GATEWAY DEVICE IN COMMUNICATION APPARATUS

BACKGROUND OF THE INVENTION

1. Field of the Invention

The present invention generally relates to a data search device that is provided in a communication apparatus and searches frame data stored in buffers. More particularly, the present invention relates to a data search device that is used in a gateway device that relays frame data to be transferred between at least two buses.

2. Description of the Related Art

When a gateway ECU (Electronic Control Unit) relays frame data to be transferred between at least two buses, it is possible to use a method for relaying frame data in order of reception, or a method for transmitting after leveling the frame data, regardless of the order of reception.

The "leveling" is to transmit in a uniform manner, regardless of the priority levels and transmission cycles of frame data. For example, in a case where frame data is consecutively received in order of A, B, C, A, D, E, A, B, C, A, D, E, . . . , the frame data is rearranged and transmitted in order of A, B, C, D, E, A, B, C, D, E, . . . .

By a known technique for leveling and transmitting frame data, a buffer is provided for each ID (IDentifier number) that identifies frame data, and frame data is read from the buffers in order of transmission. The IDs are allotted by a node (such as an ECU) located on the bus for transmitting the frame data. The IDs show the transmission source node and the priority levels of the frame data.

The buffers provided for the respective IDs are called ID-based buffers. For each area in the ID-based buffers, a flag that indicates whether data is stored in the corresponding area is recorded in a memory.

Each of the ID-based buffers is provided for each corresponding relay channel. For example, if the gateway ECU has two channels for relaying data, two ID-based buffers are provided.

When frame data is transmitted, a linear search is carried out on the flags provided for the respective areas in the ID-based buffers. Frame data is stored in the area in the ID-based buffers having a flag recorded therein (in an ON state). Accordingly, the frame data is read from the area in the ID-based buffers having the flag recorded therein, and is then transmitted.

Referring now to FIG. 1A, linear searches are described. In the first-time linear search, flags are searched from the top. In each of the second-time and later searches, however, a flag search is started from the buffer area next to the buffer area in which the previous search is ended. More specifically, in a case where the first-time search detects a flag recorded in an area of the seventh row (ID 192) from the top, as shown in FIG. 1A, the second-time search is started from the eighth row (ID 216). After the last area in the ID-based buffer is searched, the searching operation returns to the top and is repeated. If a buffer area having a flag set thereto is not found through the searching operation until the searching operation reaches the position where the search is started, the searching operation comes to an end there.

Japanese Unexamined Patent Publication No. 2005-159568 discloses a technique by which a RAM that determines beforehand the priority levels of ID codes representing transmission destinations is provided, and the transmission priority levels are determined based on the priority levels of the ID codes in the RAM if there are two or more sets of data to be next transmitted after data transmission.

Japanese Unexamined Patent Publication No. 2000-244548 aims to prevent data loss in a data relay device. According to Japanese Unexamined Patent Publication No. 2000-244548, a buffer that temporarily stores received data is provided for each type of data to be relayed, and a data controller that identifies the type of the received data and designates the buffer write destination in accordance with the data type is also provided.

However, if the number of buses between which data is relayed by a gateway ECU becomes larger, the time required for searches becomes longer, and the relay performance of the gateway ECU deteriorates.

For example, an ID-based buffer may be a buffer that can store 100 different IDs, as shown in FIG. 1B. To search the frame data stored in the 100th buffer area, it is necessary to carry out a search 100 times, starting from the top buffer area. Therefore, to maintain the high relay performance of the gateway ECU, it is necessary to prepare a high-performance CPU or restrict the number of buses between which data is relayed.

Furthermore, Japanese Unexamined Patent Publication Nos. 2005-159568 and 2000-244548 do not disclose any technique for improving the efficiency of searches to be carried out on the frame data stored in buffers.

SUMMARY OF THE INVENTION

It is therefore an object of the present invention to provide a data search device in a communication apparatus in which the above disadvantage is eliminated.

A more specific object of the present invention is to provide a data search device that is provided in a communication apparatus and can efficiently carry out a frame data search even if the amount of data to be searched becomes large.

According to an aspect of the present invention, there is provided a data search device that is provided in a communication apparatus and detects a memory area that stores data to be transmitted from a memory unit having memory areas defined by IDs allotted to data, the data search device including: a first flag that is provided for each of the memory areas of the memory unit, and indicates whether data in each corresponding memory area is updated; a second flag that is provided for each group consisting of a predetermined number of the first flags, and indicate a data update status when at least one set of data in the first flags in the corresponding group is in an updated state; and a search control unit that detects the memory area storing the data to be transmitted, by searching for the corresponding first flag after detecting the second flag.

According to another aspect of the present invention, there is provided a gateway device including: a routing part that searches for a communication channel for transferring frame data received from another communication channel; a transmission buffer that stores the frame data processed by the routing part and has divided memory areas respectively provided for IDs of frame data; a flag memory part that stores a first flag that is provided for each of the divided memory areas of the transmission buffer and indicates whether data in a corresponding one of the divided memory areas has been updated, and a second flag that is provided for each group having a given number of first flags and indicates, when at least one of the first flags in one group indicates that the data has been updated, an updated state of the data; a data memory processing part that stores the frame data processed by the routing part in the transmission buffer and updates the first and second flags stored in the flag memory part; a data search processing part that searches the second flags stored in the flag memory part and then searches the first flags to thus extract the frame data from the transmission buffer; and a transmission processing part that transmits the frame data extracted by the data search processing part to the communication channel.

According to a further aspect of the present invention, there is provided a gateway device including: a routing part that searches for a communication channel for transferring frame data received from another communication channel and sores the frame data in a transmission FIFO corresponding to the communication channel searched for; a transmission buffer that stores the frame data read from the transmission FIFO and has divided memory areas respectively provided for IDs of frame data; a flag memory part that stores a first flag that is provided for each of the divided memory areas of the transmission buffer and indicates whether data in a corresponding one of the divided memory areas has been updated, and a second flag that is provided for each group having a given number of first flags and indicates, when at least one of the first flags in one group indicates that the data has been updated, an updated state of the data; a data memory processing part that stores the frame data read from the FIFO in the transmission buffer and updates the first and second flags stored in the flag memory part; a data search processing part that searches the second flags stored in the flag memory part, searches the first flags to thus extract the frame data from the transmission buffer, and sets the frame data extracted in a message box; and a transmission processing part that transmits the frame data set in the message box to the communication channel.

BRIEF DESCRIPTION OF THE DRAWINGS

Other objects, features and advantages of the present invention will become more apparent from the following detailed description when read in conjunction with the accompanying drawings, in which:

FIGS. 1A and 1B illustrate linear searches;

FIG. 6 shows an example of a routing map;

FIG. 13A shows the bit information to be written into the bit search support register during a first-time index flag search;

FIG. 13B shows the bit information to be written into the bit search support register during a second-time index flag search;

FIGS. 13C and 13D show the procedures to be carried out by the bit search unit to carry out a data update flag search;

FIG. 16 shows the structure of frame data to be written into a transmission FIFO;

FIG. 17A shows the structure of information indicating the types of frame data; and FIG. 17B shows the structure of information indicating ID-based buffer storage positions.

DESCRIPTION OF THE PREFERRED EMBODIMENTS

The following is a description of preferred embodiments of the present invention, with reference to the accompanying drawings.

Embodiments

Figure 2:
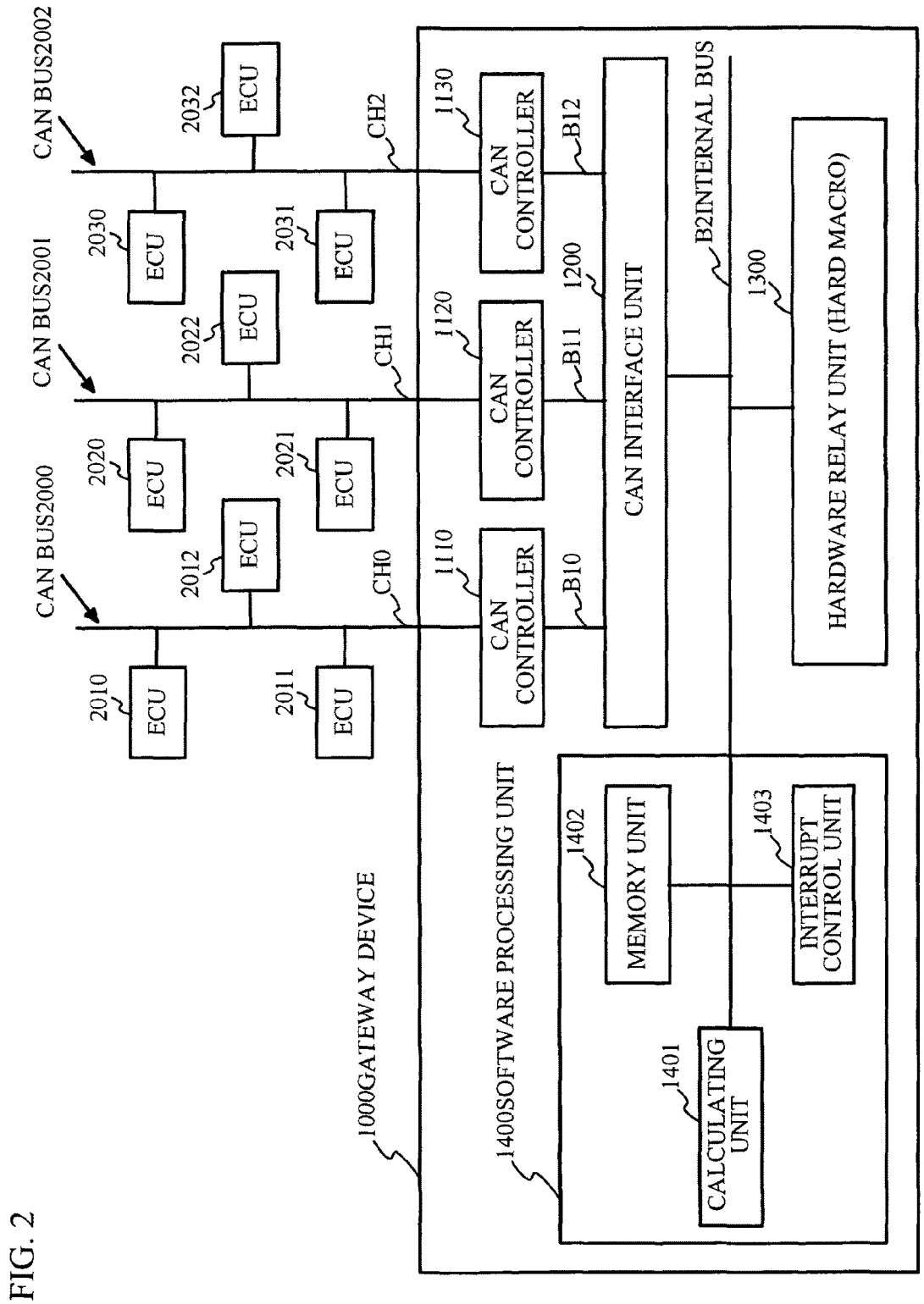
FIG. 2 illustrates the structure of a gateway device in accordance with the present invention.

Referring first to FIG. 2, the structure of this embodiment is described. FIG. 2 shows the structure of a gateway device 1000 as an embodiment of a communication apparatus in accordance with the present invention.

The gateway device 1000 is a device that relays frame data that are transmitted and received between ECUs connected to communication buses. A CAN (Controller Area Network) bus 2000, a CAN bus 2001, and a CAN bus 2002 are connected as the communication buses to the gateway device 1000 of this embodiment.

More than one ECU is connected to each of the CAN buses 2000, 2001, and 2002. In this embodiment, ECUs 2010, 2011, and 2012 are connected to the CAN bus 2000. ECUs 2020, 2021, and 2022 are connected to the CAN bus 2001. ECUs 2030, 2031, and 2032 are connected to the CAN bus 2002.

The ECUs 2010 through 2012, 2020 through 2022, and 2030 through 2032 are vehicle control ECUs, such as engine ECUs, body ECUs, power management ECUs, and airbag ECUs.

Although not shown in the drawing, the ECUs 2010 through 2012, 2020 through 2022, and 2030 through 2032 are connected to the gateway device 1000 via communication networks that perform communications by different communication methods or at different communication speeds. In this embodiment, the ECUs 2010 through 2012, 2020 through 2022, and 2030 through 2032 communicate with the gateway device 1000 with the use of the CAN protocol. However, the present invention is not limited to that arrangement, and the ECUs 2010 through 2012, 2020 through 2022, and 2030 through 2032 may perform communications with the use of the LIN (Local Interconnect Network) protocol.

The gateway device 1000 receives frame data from the ECUs 2010 through 2012, 2020 through 2022, and 2030 through 2032. The gateway device 1000 then converts the received frame data in accordance with the communication speed and the communication method used in the communication network to which the received frame data is to be relayed. After that, the gateway device 1000 relays the received frame data. When the gateway device 1000 relays data, the unit of data to be received or transmitted at once is called "frame data". In this embodiment, frame data is described as data that has a predetermined length from predetermined data serving as a frame in accordance with the CAN protocol, for example. However, the present invention is not limited to that.

The gateway device 1000 in accordance with the present invention includes a relay unit that relays frame data through hardware processing, and another relay unit that relays frame data mainly through software processing.

Referring to FIG. 2, an example of the hardware structure of the gateway device 1000 is described. The gateway device 1000 includes CAN controllers 1110, 1120, and 1130, a CAN interface unit 1200, a hardware relay unit (hereinafter also referred to as the hard macro) 1300, and a software processing unit 1400. The software processing unit 1400 functions as the data search device of the communication apparatus of this embodiment.

Although the gateway device 1000 includes the three CAN controllers 1110 through 1130 in this embodiment, the number of CAN controllers is not limited to that, as long as there are two or more CAN controllers.

Since the CAN controllers 1110 through 1130 have the same connections, the same structures, and the same functions as one another, only the CAN controller 1110 will be described in the following.

The CAN controller 1110 is connected to the CAN bus 2000, and is also connected to the CAN interface unit 1200. The CAN controller 1110 receives frame data from the ECUs 2010 through 2012 serving as control devices. The CAN controller 1110 outputs the received frame data to the hardware relay unit 1300 or the software processing unit 1400.

The CAN controller 1110 also obtains frame data to be relayed to the ECUs 2010 through 2012 as relay destinations from the hardware relay unit 1300 or the software processing unit 1400. The CAN controller 1110 then transmits the obtained frame data to the ECUs 2010 through 2012.

The transmission paths connecting the CAN controllers 1110 through 1130 and the CAN buses 2000 through 2002 are called channels. In this embodiment, the transmission path connecting the CAN controller 1110 and the CAN bus 2000 is a channel CH0, the transmission path connecting the CAN controller 1120 and the CAN bus 2001 is a channel CH1, and the transmission path connecting the CAN controller 1130 and the CAN bus 2002 is a channel CH2.

Figure 3:
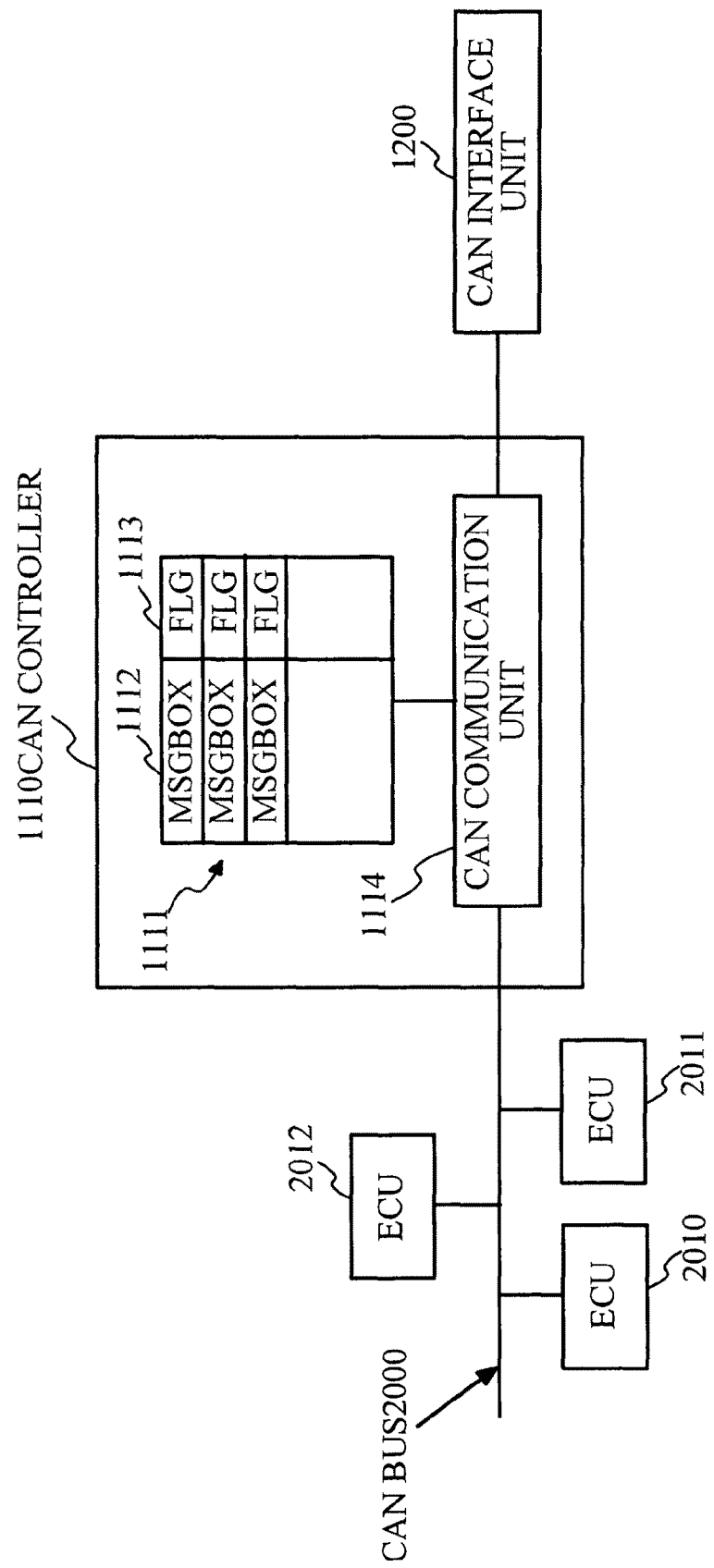
FIG. 3 illustrates the structure of a CAN controller.

Referring now to FIG. 3, an example of the hardware structure of the CAN controller 1110 is described. FIG. 3 illustrates the example of the hardware structure of the CAN controller 1110.

The CAN controller 1110 includes a buffer 1111 and a CAN communication unit 1114.

The buffer 1111 is formed with a RAM (Random Access Memory) and a register, for example, and is connected to the CAN communication unit 1114. The buffer 1111 is formed with message boxes 1112 and completion flags 1113 associated with each other.

Figure 4:
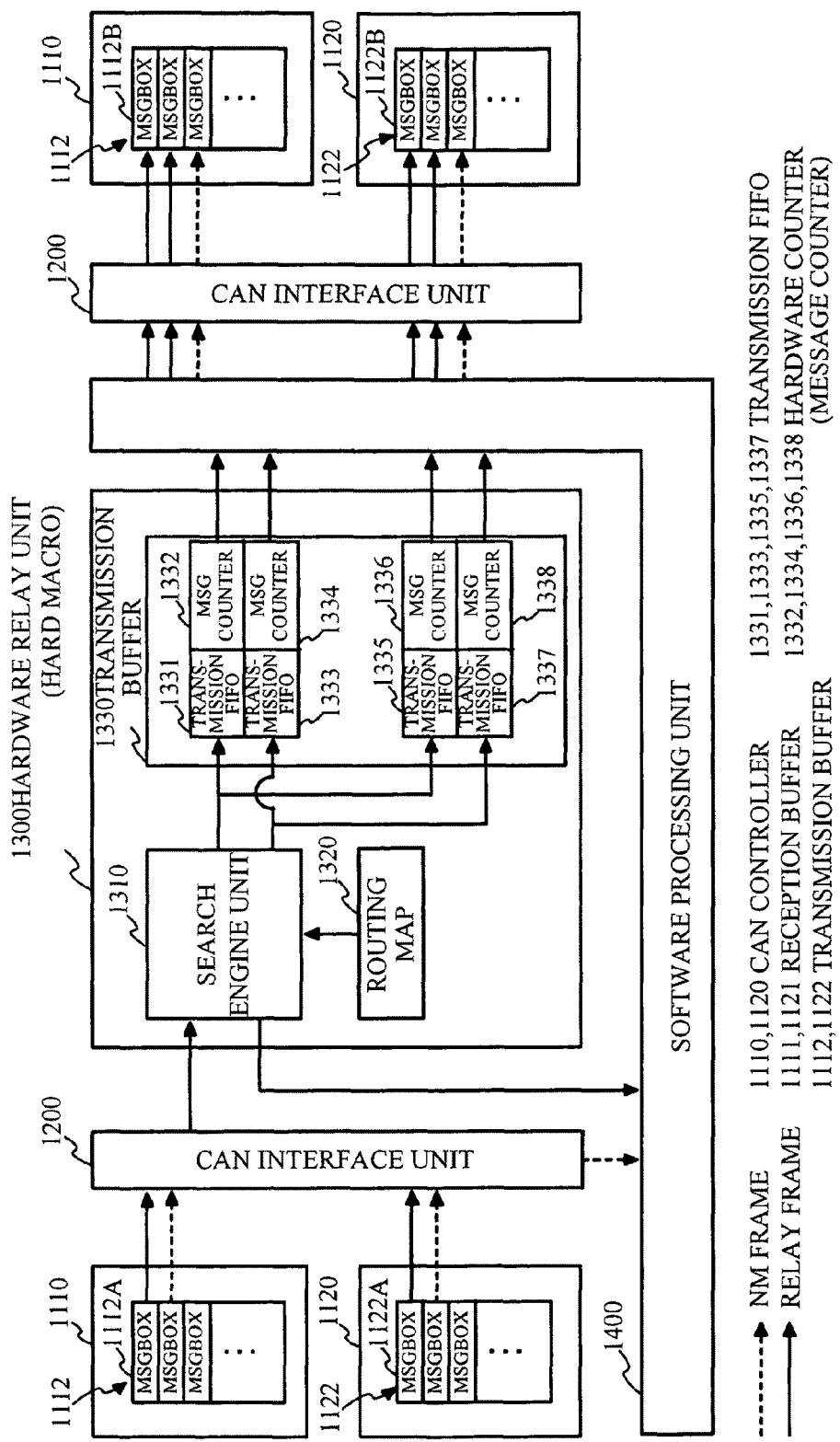
FIG. 4 illustrates the structure of the hardware relay unit.

Each of the message boxes 1112 is formed with a RAM, for example, and is divided into a receiving message box 1112A (see FIG. 4) and a transmitting message box 1112B (see FIG. 4). The receiving message box 1112A is a memory area that stores the frame data received through the CAN communication unit 1114. The transmitting message box 1112B is a memory area that stores the frame data to be transmitted to the CAN bus 2000. In FIG. 4, the message boxes 1112 and 1122 are divided into the receiving message boxes 1112A and 1122A, and the transmission message boxes 1112B and 1122B, for convenience sake. In practice, however, each of the message boxes 1112 and 1122 are used both for transmission and reception. It is of course possible to prepare receiving message boxes separately from transmitting message boxes.

Each of the completion flags 1113 is stored in a register, for example, and is provided in each corresponding receiving message box 1112A and each corresponding transmitting message box 1112B. Each receiving completion flag 1113 is a flag to be set (or turned ON) when the operation to receive the frame data to be processed by the CAN communication unit 1114 is completed. More specifically, each receiving completion flag 1113 is a flag that indicates that data that is received by the CAN communication unit 1114 but has not been obtained by the hardware relay unit 1300 or the software processing unit 1400 is stored in each corresponding message box 1112.

Each transmitting completion flag 1113 is a flag that is withdrawn (or turned OFF) when frame data is stored in each corresponding transmitting message box 1112B. Also, when the stored frame data is transmitted to the ECU 2010, the flag is set (or turned ON).

The CAN communication unit 1114 is connected to the buffer 1111, the CAN interface unit 1200, and the CAN bus 2000.

The CAN communication unit 1114 performs a CAN receiving operation, so as to receive frame data from the CAN bus 2000 in accordance with the CAN protocol. The CAN communication unit 1114 stores the received frame data into one of the receiving message boxes 1112A, and sets the receiving completion flag 1113 associated with the receiving message box 1112A that stores the frame data.

The CAN communication unit 1114 further outputs a reception interrupt signal to the hardware relay unit 1300 and the software processing unit 1400 via the CAN interface unit 1200, so as to notify that the CAN communication unit 1114 has received the frame data.

Upon receipt of the reception interrupt signal, the hardware relay unit 1300 or the software processing unit 1400 refers to the frame data via the CAN interface unit 1200. The hardware relay unit 1300 or the software processing unit 1400 then withdraws the completion flag associated with the receiving message box 1112A that stores the referred data.

The CAN communication unit 1114 also performs a CAN transmitting operation to transmit the frame data output from the CAN interface unit 1200 to the CAN bus 2000 in accordance with the CAN protocol.

After completing the transmission of the frame data to the CAN bus 2000, the CAN communication unit 1114 sets the completion flag associated with the transmitting message box 1112B that stores the transmitted data.

The CAN receiving operation and the CAN transmitting operation are known operations for transmitting and receiving frame data in accordance with the CAN protocol, and therefore, explanation of them is omitted here.

Referring back to FIG. 2, explanation of the structure of the gateway device 1000 is now resumed.

The CAN interface unit 1200 is connected to the CAN controllers 1110 through 1130 and the hardware relay unit 1300. The CAN interface unit 1200 provides the interface between each of the buses B10 through B12 that enable data transfers between the CAN controllers 1110 through 1130 and the CAN interface unit 1200, and the internal bus B2 that enables data transfers between the CAN interface unit 1200 and the hardware relay unit 1300 or the hardware processing unit 1400.

The CAN interface unit 1200, the hardware relay unit 1300, and the software processing unit 1400 are connected so that data transfers to one another can be performed via the internal bus B2.

The hardware relay unit 1300 performs the later described hardware relaying operation to relay the data to be transmitted and received among the ECUs 2010 through 2012, 2020 through 2022, and 2030 through 2032, which are control devices for controlling the behaviors of the vehicle. The hardware relaying operation is an operation to be performed with the use of the hardware.

Referring now to FIG. 4, the hardware structure of the hardware relay unit 1300 is described. FIG. 4 shows an example of the hardware structure of the hardware relay unit 1300.

The hardware relay unit 1300 includes a search engine unit 1310, a routing map 1320, and a transmission buffer 1330.

Figure 5:
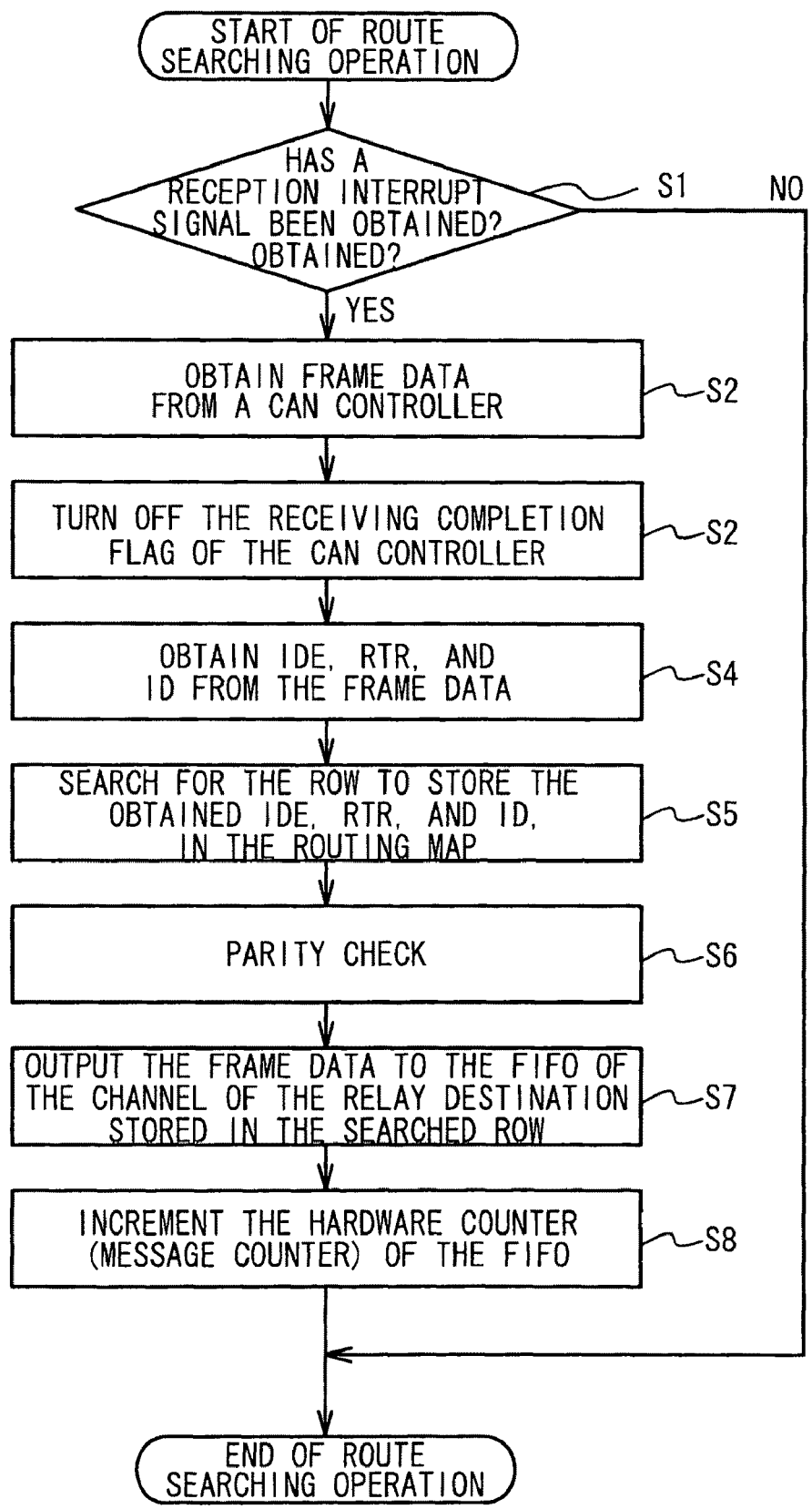
FIG. 5 is a flowchart showing the operation to be performed by the search engine unit.

Although not shown in the drawing, the search engine unit 1310 has a memory formed with a RAM, for example. The search engine unit 1310 is connected to the CAN interface unit 1200, the routing map 1320, the transmission buffer 1330, and the software processing unit 1400. The search engine unit 1310 performs a route searching operation to search for the channel of a relay destination or the like, based on frame data. Referring now to FIG. 5, the route searching operation to be performed by the search engine unit 1310 is described. FIG. 5 is a flowchart showing an example of the route searching operation to be performed by the search engine unit 1310.

First, the search engine unit 1310 determines whether a reception interrupt signal has been obtained from the CAN controllers 1110 through 1130 (step S1). When determining that the reception interrupt signal has been obtained, the search engine unit 1310 carries out the procedure of step S2. When determining that the reception interrupt signal has not been obtained, the search engine unit 1310 ends the route searching operation.

If the search engine unit 1310 determines in step S1 that the reception interrupt signal has been obtained, the search engine unit 1310 obtains the frame data about the relay frame from the CAN controllers 1110 through 1130 via the CAN interface unit 1200 (step S2).

After that, the search engine unit 1310 withdraws (or turns OFF) the receiving completion flag of the CAN controllers 1110 through 1130 associated with the obtained relay frame data (step S3). The search engine unit 1310 then obtains the format type IDE of the frame data, the frame type RTR, the ID of the device that has transmitted the frame data, the channel of the relay starter, the channel of the relay destination, and the likes, from the obtained frame data (step S4).

In the routing map 1320, the search engine unit 1310 searches for the row in which the obtained format type IDE, the frame type RTR, the ID, the channel of the relay starter, the channel of the relay destination, and the likes are to be stored (step S5).

The search engine unit 1310 then performs a parity checking operation to check the data in the detected row with the use of parity (step S6). The checking operation is not limited to a parity checking operation, and it is also possible to check for data errors with the use of the checksum, CRC (Cyclic Redundancy Check), hash values, hamming codes, sparse graph codes, or convolutional codes, for example.

After carrying out step S6, the search engine unit 1310 outputs the frame data to the transmission FIFO (First In First Out) of the channel TxCH of the relay destination stored in the searched row (step S7).

Each transmission FIFO is a memory area of the later described transmission buffer 1330, and is used for storing frame data in first-in first-out order. The transmission buffer 1330 has transmission FIFOs for the respective channels of the transmission destinations of stored frame data and the respective types of frame data.

After carrying out step S7, the search engine unit 1310 increments the hardware counter (or message counter) associated with the FIFO that has output the frame data (step S8). The search engine unit 1310 then ends performing the route searching operation.

The hardware counter is a counter that indicates the number of data sets stored in the associated FIFO. The hardware counter also indicates the number of data sets to be relayed by the hardware relay unit 1300.

Referring back to FIG. 4, explanation of the structure of the hardware relay unit 1300 is now resumed.

The routing map 1320 is formed with various memories such as ROM (Read Only Memory) and a RAM (Random Access Memory), for example. The routing map 1320 is connected to the search engine unit 1310.

The routing map 1320 stores a table that associates the format type IDE (identifier field) of frame data, the frame type RTR (Remote Transmission Request), the ID (identifier number), and the relay starter and relay destination of frame data with one another.

Referring now to FIG. 6, the table stored in the routing map 1320 is described. FIG. 6 shows an example of the table stored in the routing map 1320.

The table shown in FIG. 6 has a Par1 field, an IDE field, an RTR field, an ID field, a Par2 field, a FIFO field, a TxCH field, a Label1 field, a Label0 field, an RxCH field, and a MaskInfo field.

The Par1 field stores the parities of the data stored in the RTR field and the ID field. The IDE field stores the format types of frame data. The RTR field stores the frame types. The ID field stores the CAN IDs. In the following description, each CAN ID will be referred to simply as ID. Each ID is allotted by a CAN node (such as an ECU) located on the bus for transmitting frame data. The ID shows the node of the transmitting source and the priority level of the frame data.

The Par2 field stores the parities of the data stored in the fields from the FIFO field to the MaskInfo field. The FIFO field stores the FIFOs of the relay destinations. The TxCH field stores the channels of the relay destinations. The Label1 and Label0 fields store the data to be added to the data to be relayed. The RxCH field stores the channels of receiving sources (hereinafter referred to simply as the receiving source channels). The MaskInfo field stores the masking values to be used for calculating the indexes to be used in sorting out the rows.

The IDE field, the RTR field, and the ID field are key fields. In the table, there are no rows that have exactly the same data in the IDE fields, the RTR fields, and the ID fields.

Referring back to FIG. 4, explanation of the structure of the hardware relay unit 1300 is now resumed.

The transmission buffer 1330 is formed with RAMs and registers, for example. The transmission buffer 1330 is connected to the search engine unit 1310 and the software processing unit 1400.

The memory areas of the RAMs of the transmission buffer 1330 form transmission FIFOs 1331, 1333, 1335, and 1337 that store frame data. The registers of the transmission buffer 1330 form hardware counters (or message counters) 1332, 1334, 1336, and 1338 that indicate the numbers of data sets stored in the respective transmission FIFOs 1331, 1333, 1335, and 1337. The FIFOs have already been described, and therefore, explanation of them is omitted here.

The transmission FIFOs 1331 and 1333 store the frame data to be relayed to the channel CH0. The transmission FIFOs 1335 and 1337 store the data to be relayed to the channel CH1.

Different kinds of frame data are stored in the transmission FIFOs 1331 and 1333. The frame data are stored into the transmission FIFOs 1331 and 1333 in accordance with the information TxCH and FIFO (the relay destination information) about the entry that is determined to have the same IDE, RTR, and ID through a search of the routing map 1320. The same applies to the transmission FIFOs 1335 and 1337, and therefore, explanation of the cases with the FIFOs 1335 and 1337 is omitted here.

In FIG. 4, the FIFO that stores the frame data to be relayed to the channel CH2 by the hardware relay unit 1300, and the counter that indicates the number of data sets stored in the FIFO are not shown, and therefore, explanation of them is omitted here. However, it should be understood that the hardware relay unit 1300 has the function to relay frame data to the channel CH2.

Referring back to FIG. 2, explanation of the structure of the gateway device 1000 is now resumed.

The software processing unit 1400 performs software processing to relay data to be transmitted and received among the ECUs 2010 through 2012, 2020 through 2022, and 2030 through 2032, which are control devices that control the behaviors of the vehicle.

The software processing unit 1400 includes a calculating unit 1401 such as a CPU (Central Processing Unit), a memory unit 1402 such as a flash memory, and an interrupt control unit 1403. The calculating unit 1401, the memory unit 1402, and the interrupt control unit 1403 are connected, so that data exchanges through the respective buses can be performed.

The software processing unit 1400 embodies the later described functions by the calculating unit 1401 reading a program stored in the memory unit 1402 and performing an operation in accordance with the program.

Figure 9:
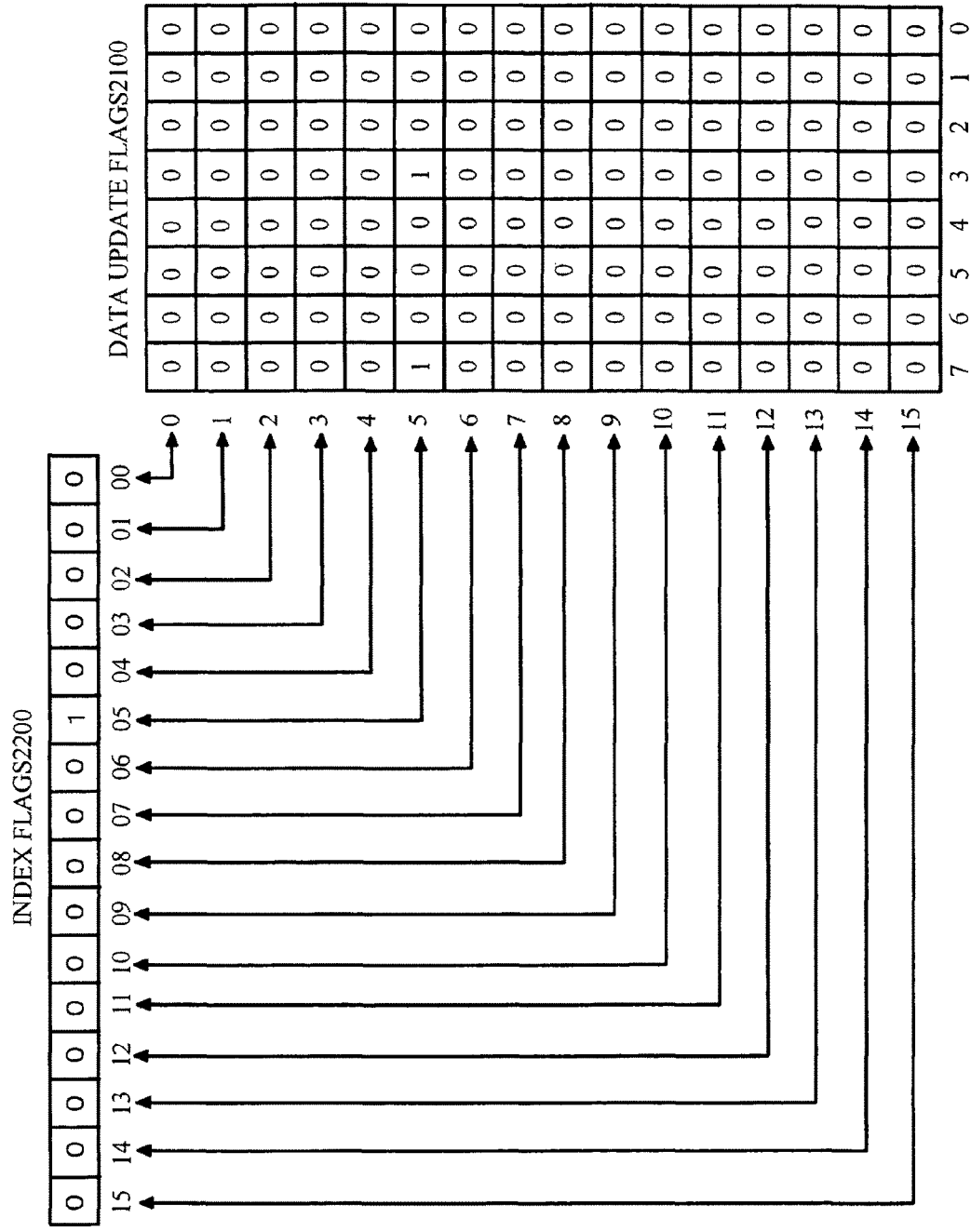
FIG. 9 show data update flags and index flags.

In the memory unit 1402, the later described data update flags 2100 and index flags 2200 shown in FIG. 9 are recorded.

The interrupt control unit 1403 controls inputting and outputting of interrupt signals for requesting the calculating unit 1401 to perform an interrupt and an operation or the like to control other hardware such as the hardware relay unit 1300.

Figure 7:
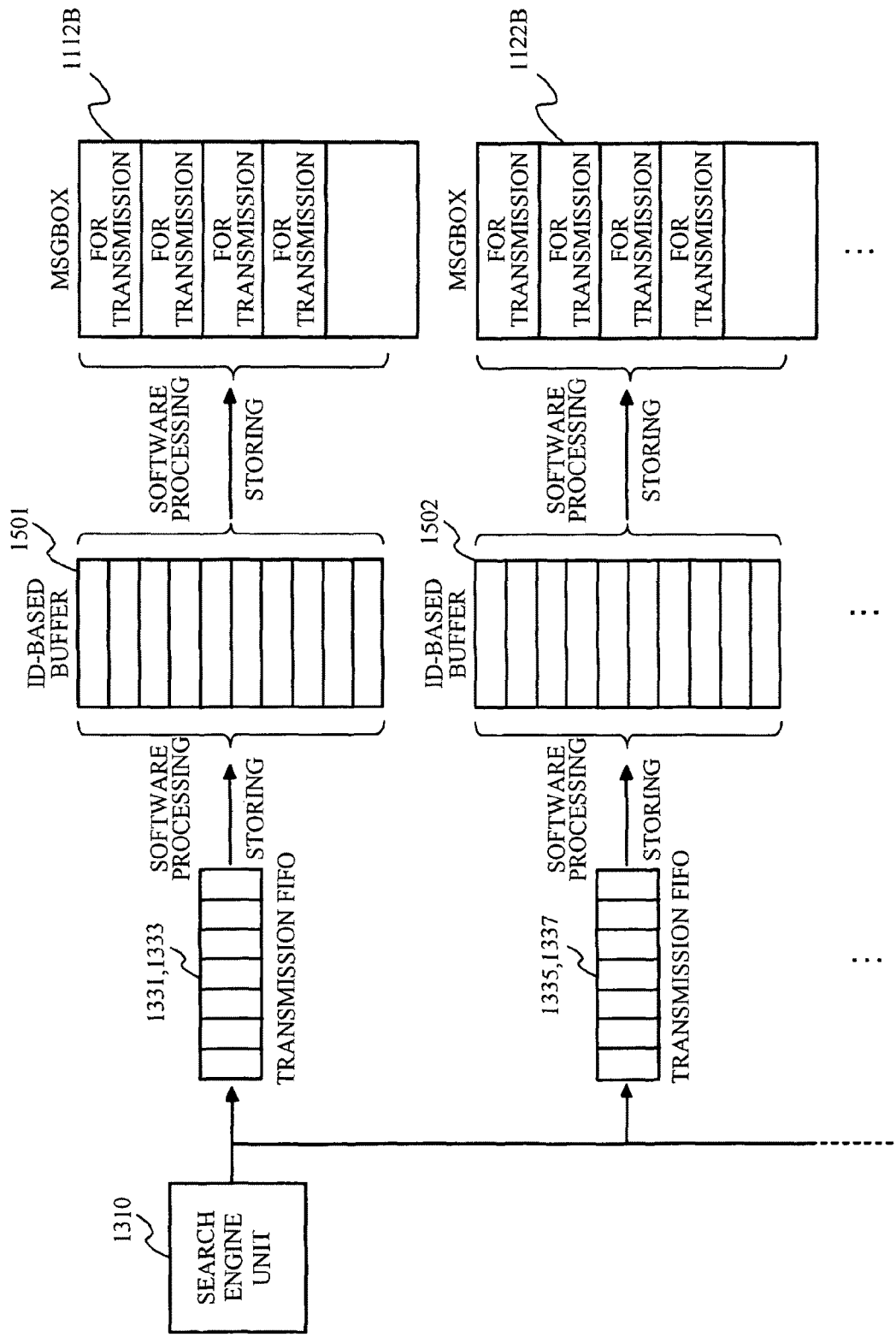
FIG. 7 shows an operation flow of frame data after routing is performed by the search engine unit.

Referring now to FIG. 7, the flow of the operation to level and transmit frame data is described. Here, the software processing unit 1400 receives an interrupt signal from the search engine unit 1310, and accesses the transmission FIFOs 1331, 1333, 1335, and 1337. However, the software processing unit 1400 may access the transmission FIFOs 1331, 1333, 1335, and 1337 at regular intervals, regardless of the interrupt signal from the search engine unit 1310, and perform processing on the frame data stored in the transmission FIFOs 1331, 1333, 1335, and 1337.

After storing frame data in the transmission FIFO corresponding to the channel of the transmission destination (here, the frame data is stored in the transmission FIFO 1331 for ease of explanation), the search engine unit 1310 outputs an interrupt signal to the software processing unit 1400. The interrupt signal may be output every time the search engine unit 1310 stores the frame data of one frame into the transmission FIFO 1331, or may be output after the search engine unit 1310 stores the frame data of a predetermined number of frames into the transmission FIFO 1331. FIG. 7 does not show the path for outputting interrupt signals from the search engine unit 1310 to the software processing unit 1400. Each interrupt signal output from the search engine unit 1310 is sent to the calculating unit 1401 under the control of the interrupt control unit 1403 shown in FIG. 2.

After receiving the interrupt signal from the search engine unit 1310, the software processing unit 1400 determines whether the frame data stored in the transmission FIFO 1331 is frame data to be leveled. Based on additional information that is added to the frame data by the search engine unit 1310, the software processing unit 1400 determines whether the frame data is to be leveled or is to be relayed without a leveling process. Based on the ID allotted to the frame data, the search engine unit 1310 determines whether the frame data is to be leveled and then transmitted, or is to be transmitted without a leveling process. The search engine unit 1310 then performs routing, and adds a label value as the additional information to the frame data when writing the frame data into the transmission FIFO 1331 (1333, 1335, 1337) at the transfer destination (the label value will be described later in detail, with reference to FIG. 15). Based on the label value added by the search engine unit 1310, the software processing unit 1400 determines whether the frame data is to be leveled, or is to be transmitted without a leveling process.

An ID is set for each node for performing CAN communications (or for each ECU connected to the CAN buses 2000, 2001, and 2002 shown in FIG. 2), and is added to frame data by the transmission node that transmits the frame data. Whether frame data is to be leveled and then transmitted or is to be transmitted without a leveling process is determined in advance in accordance with the corresponding ID (or the transmission destination node).

When determining that the frame data is to be leveled based on the label value, the software processing unit 1400 temporarily stores the frame data in the buffer associated with the ID (for ease of explanation, the frame data is stored in an ID-based buffer 1501 here). When determining that the frame data is not to be leveled based on the label value, the software processing unit 1400 stores the frame data into the transmitting message box 1112B, instead of the ID-based buffer 1501. The software processing unit 1400 performs the same processing on the frame data stored in the transmission FIFOs 1333 and 1337, and stores the frame data not to be leveled into the transmitting message box 1122B. The software processing unit 1400 also temporarily stores the frame data to be leveled into the ID-based buffer 1502.

The ID-based buffers 1501 and 1502 have memory areas divided in accordance with IDs. By referring to the indirect table shown in FIG. 15 in accordance with the label value allotted to frame data, the software processing unit 1400 stores the frame data into the corresponding one of the ID-based buffers 1501 and 1502. Also, for each area in the respective ID-based buffers 1501 and 1502, an area for recording a flag indicating whether frame data is stored in each corresponding area is provided in the RAM 3001 (the memory unit 1402). After storing frame data in the ID-based buffers 1501 and 1502, the software processing unit 1400 records a flag in the area of the RAM 3001 corresponding to the ID-based buffer storing the frame data (or records the data indicating that data is stored or updated in the ID-based buffer, into the RAM 3001).

After frame data is stored into the ID-based buffers 1501 and 1502, a linear search is carried out so as to level and transmit the frame data. To carry out the linear search, a bit search unit 1600 (hardware: see FIG. 8) mounted on the gateway device 1000 is used. The software processing unit 1400 uses the bit search unit 1600 to detect the memory area of the ID-based buffers 1501 and 1502 storing the frame data to be transmitted.

After the bit search unit 1600 detects the memory area of the ID-based buffers 1501 and 1502 storing the frame data to be transmitted, the software processing unit 1400 obtains the frame data from the detected memory area, and stores the frame data into the corresponding transmitting message box 1112B.

A search request from the software processing unit 1400 to the bit search unit 1600 may be made at regular intervals or when there is room in the corresponding transmitting message box 1112B. The software processing unit 1400 may output a search request to the bit search unit 1600 at regular intervals. When detecting room in the transmitting message boxes 1112B, the software processing unit 1400 may output a search request to the bit search unit 1600. To determine whether there is room in the transmitting message box 1112B, an interrupt signal indicating completion of transmission from the CAN controllers 1110 through 1130 can be used. When the frame data stored in the transmitting message box 1112B is transmitted to the ECU designated as the transmission destination, the CAN controllers 1110 through 1130 output a transmission completion interrupt signal to the software processing unit 1400. Upon receipt of the interrupt signal, the software processing unit 1400 recognizes that there is room in the transmitting message box 1112B.

Figure 8:
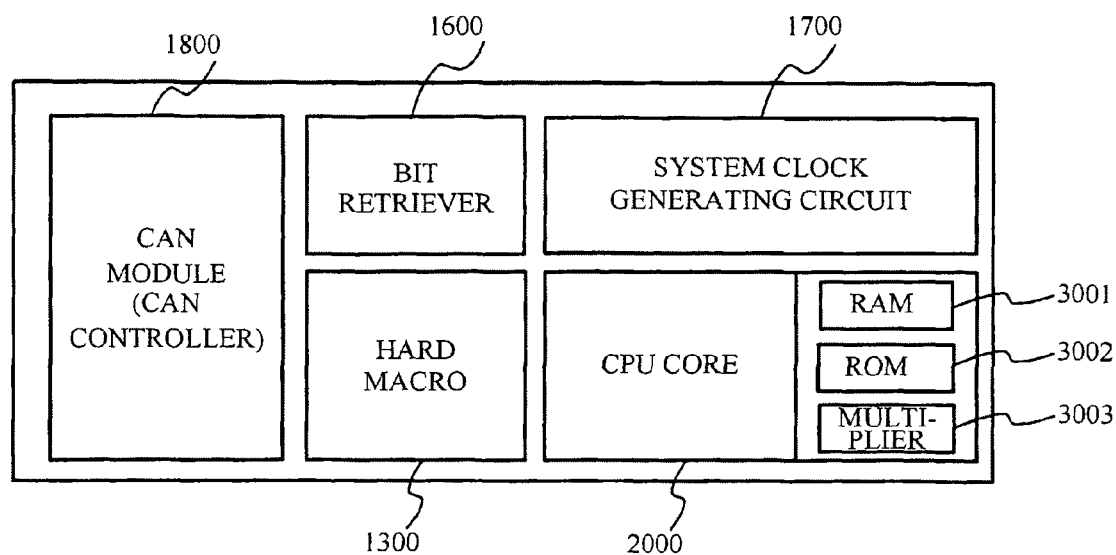
FIG. 8 illustrates the hardware structure of the gateway device.

FIG. 8 shows the hardware structure of the gateway device 1000. The gateway device 1000 includes a CPU core 3000, a RAM 3001, a ROM 3002, a multiplier 3003, the bit search unit 1600, the hard macro (the hardware relay unit) 1300, a CAN module 1800, a system clock generating circuit 1700, and the likes. The CAN module 1800 is equivalent to the CAN controllers 1110 through 1130 that perform CAN communications. The system clock generating circuit 1700 provides the operation clock of the CPU core 3000.

Programs to be used by the CPU core 3000 to perform operations are stored in the ROM 3002. The CPU core 3000 performs operations in accordance with the programs, so as to realize the calculating unit 1401 and the interrupt control unit 1403 in the software processing unit 1400 shown in FIG. 2. The later described data update flags 2100 and index flags 2200 shown in FIG. 9 are recorded in the RAM 3001 (the memory unit 1402). The multiplier 3003 performs multiplying operations for the CPU core 3000.

FIG. 9 shows the structure of the flag data storage area of the RAM 3001 that stores the flags indicating whether frame data is stored in the ID-based buffers 1501 and 1502.

As shown in FIG. 9, the data update flags 2100 as first flags and the index flags 2200 as second flags are recorded in the flag data storage area of the RAM 3001.

The data update flags 2100 of this embodiment are stored in the flag data storage area of the RAM 3001 that is formed in a 16-row 8-column matrix fashion. When frame data is stored into the ID-based buffer 1501 or 1502, the status of the corresponding data update flag 2100 is switched from "0" to "1". In other words, the flag is in a recorded state, and indicates that the frame data has been updated.

The index flags 2200 are provided for each group including bits of the data update flags 2100. When at least one of the data update flags 2100 included in the groups indicates that data has been updated, the corresponding index flag 2200 indicates the status of the data update. In this embodiment, the information of each one row of the data update flags 2100 is represented by one bit of the index flags 2200, as shown in FIG. 9.

For example, if "1" is recorded in one of the bits of the sixth row of the data update flags 2100 (five rows among the rows 0 through 15 among the data update flags 2100 shown in FIG. 9), "1" is also recorded in the bit "05" of the corresponding index flags 2200.

As the index flags 2200 collectively represent the information of the bits of the data update flags 2100, a search for a memory area of an ID-based buffer storing frame data can be efficiently carried out.

The flag data storage area of the RAM 3001 storing the data update flags 2100 shown in FIG. 9 can store 128 different IDs, having the 16 rows and 8 columns. However, as the areas of the ID-based buffers 1501 and 1502 are expanded, the flag data storage area of the RAM 3001 storing the data update flags 2100 is also expanded. For example, 16 rows and 16 columns of data update flags 2100 may be stored in the flag data storage area, or the same 16 row and 8 columns of data update flags 2100 may be stored as second data update flags in the flag data storage area.

Also, the number of bits in one row of the data update flags 2100 is a power-of-two number, so that the bit locations of the data update flags 2100 and the bit locations of the index flags 2200 can be readily detected.

For example, when frame data is stored into the ID-based buffers 1501 and 1502, the software processing unit 1400 divides the ID number by 8, so as to calculate the bit locations of the data update flags 2100 and the bit locations of the index flags 2200. As the bit number of the data update flags 2100 is a power-of-two number here, the process of dividing the ID number by 8 can be skipped. For example, if the ID is "50", "50" is "110010" in the binary system, and the higher-order 3 bits "110" represent the row information about the data update flags 2100 or the bit location information about the index flags 2200. Also, the lower three bits represent the column information about the data update flags 2100.

Figure 10:
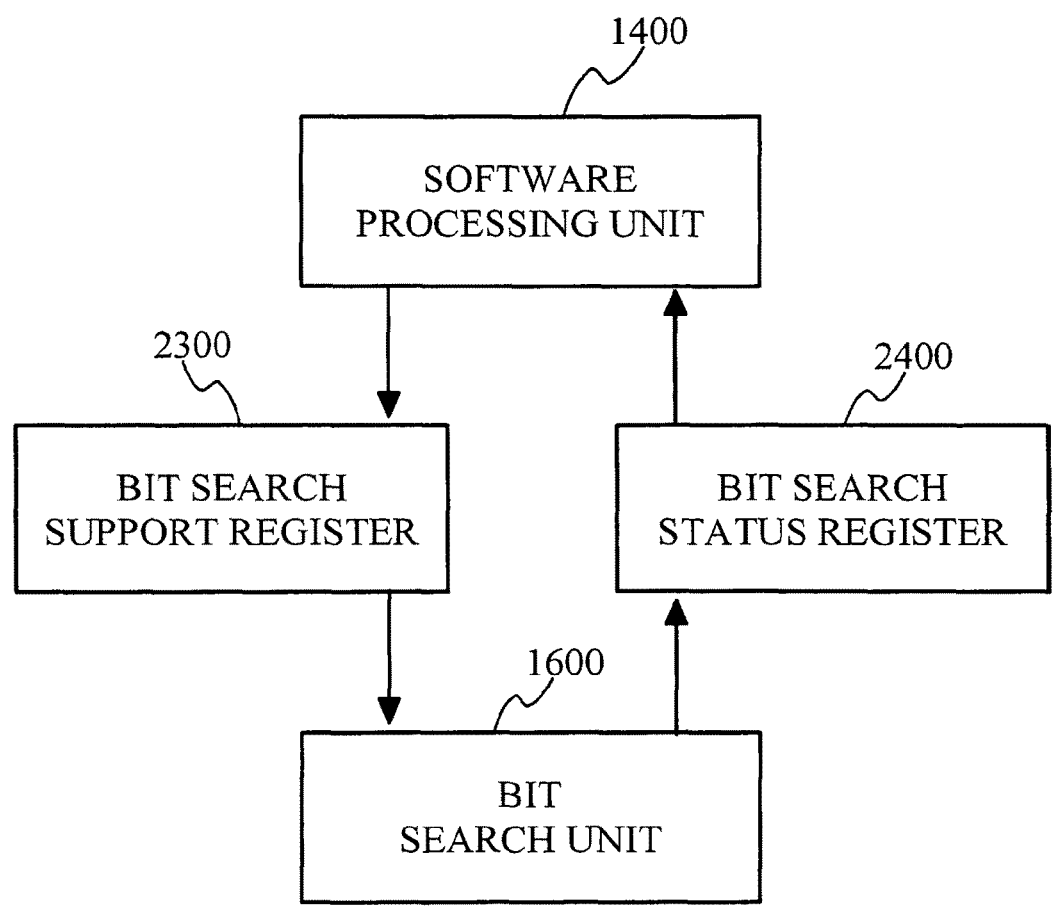
FIG. 10 shows registers to be used by the software processing unit to carry out a bit search with the use of the bit search unit.

To cause the bit search unit 1600 to search the data update flags 2100 and the index flags 2200, the software processing unit 1400 writes the bit information about the data update flags 2100 or the index flags 2200 into a bit search support register 2300 shown in FIG. 10. The bit information is the bit location information used for causing the bit search unit 1600 to search the index flags 2200 or the data update flags 2100 having flags recorded therein. For example, the bit information corresponds to one of "00" through "15" among the index flags 2200 shown in FIG. 9, and one of the rows 0 through 15 among the data update flags 2100. The bit search unit 1600 refers to the bit information written in the bit search support register 2300, so as to detect the bit position of the data update flag 2100 or the index flag at which a flag is recorded. After searching the data update flags 2100 and the index flags 2200, the bit search unit 1600 writes the bit position having the flag recorded therein into a bit search status register 2400 shown in FIG. 10. If a bit position having a flag recorded therein is not detected, the bit search unit 1600 writes information indicating that there are no bit positions having flags recorded therein, into the bit search status register 2400. Alternatively, the bit search unit 1600 does not perform writing into the bit search status register 2400. The software processing unit 1400 then refers to the bit search status register 2400, so as to recognize the results of the search carried out by the bit search unit 1600 on the data update flags 2100 or the index flags 2200.

As described above, the bit search unit 1600 of the hardware carries out a bit information search of the index flags 2200 or the data update flags 2100 in this embodiment. Accordingly, the processing load on the software processing unit 1400 can be reduced.

The bit search support register 2300 and the bit search status register 2400 shown in FIG. 10 can also be realized by the CPU core 3000 shown in FIG. 8 and the bit search unit 1600 using the RAM 3001 shown in FIG. 8 as the storage area.

Figure 11:
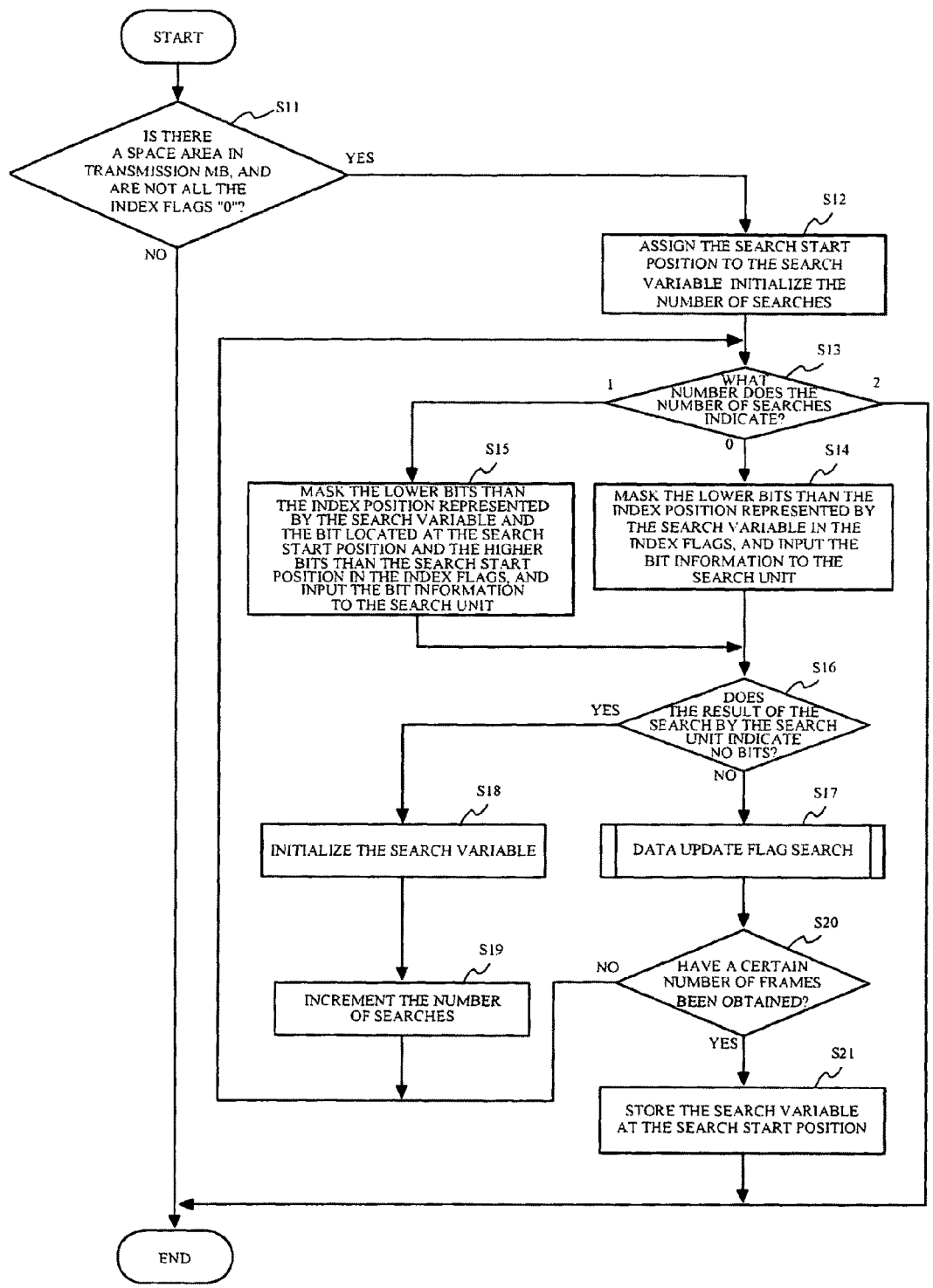
FIG. 11 shows an operation to be performed by the software processing unit to carry out an index flag search.
Figure 12:
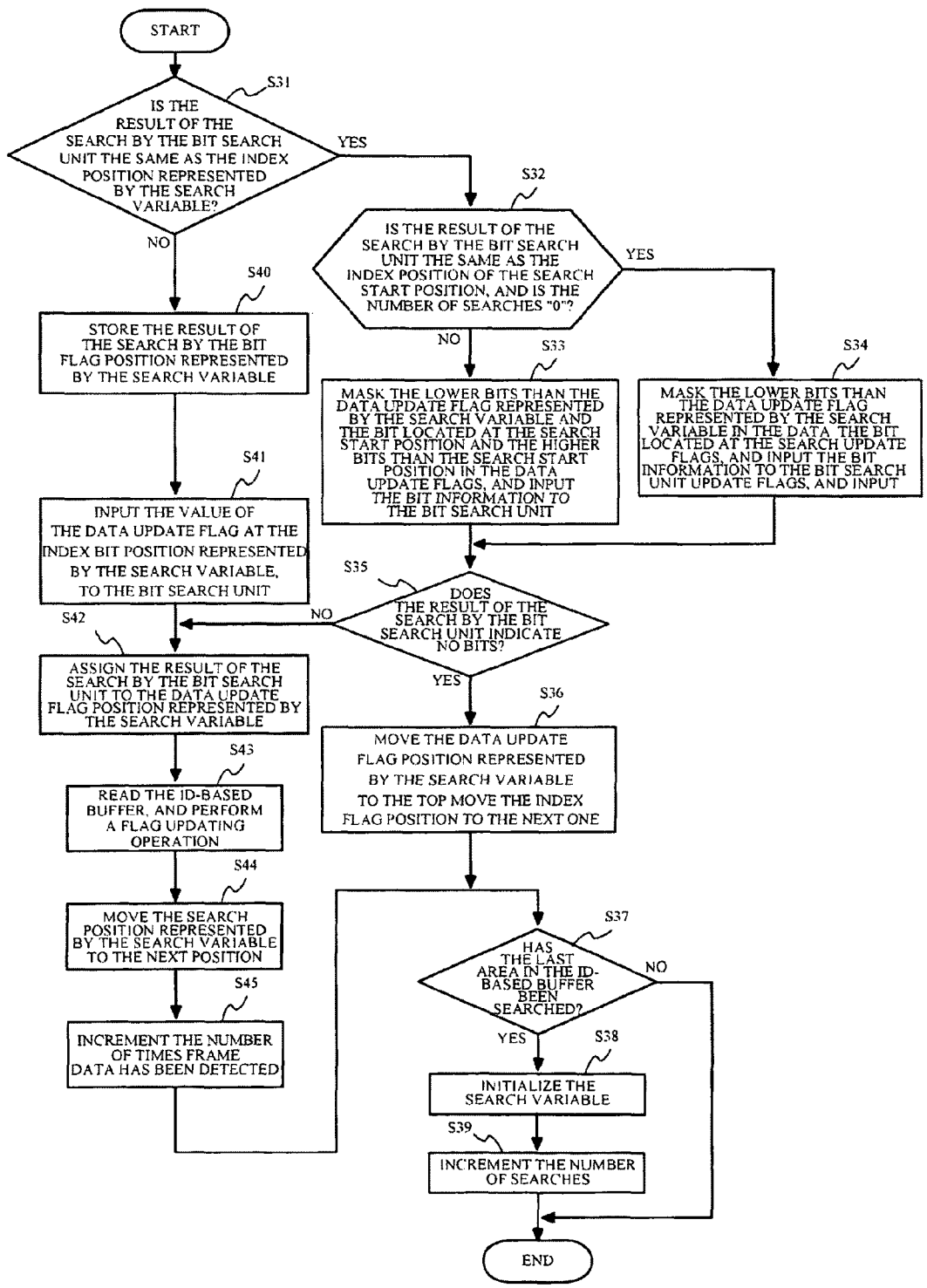
FIG. 12 shows an operation to be performed by the software processing unit to carry out a data update flag search.

Next, the procedures to be carried out by the software processing unit 1400 are described. FIGS. 11 and 12 show the procedures to be carried out by the software processing unit 1400 to perform a flag search operation with the use of the bit search unit 1600.

Referring now to FIG. 11, the procedures to be carried out to cause the bit search unit 1600 to search the index flags 2200 are described first.

The software processing unit 1400 first determines whether there is a space area in the transmitting message boxes 1112B (for ease of explanation, data is to be stored in the transmitting message boxes 1112B in the following), and whether all the bits of the index flags 2200 are "0" (step S11). If there is not a space area in the transmitting message boxes 1112B, or if all the bits of the index flags 2200 are "0" ("no" in step S11), the software processing unit 1400 ends this operation.

If there is a space area in the transmitting message boxes 1112B, and not all the bits of the index flags 2200 are "0" ("yes" in step S11), the software processing unit 1400 assigns the search start position to the search variable, and initializes the variable representing the number of searches (step S12). More specifically, the variable representing the number of searches is set at "0". The search variable is the variable designed for the software processing unit 1400 to identify a search position among the index flags 2200 and the data update flags 2100.

When the first-time search is carried out (the number of searches is 0), the search variable represents the search start bit position in the index flags 2200 to be searched by the bit search unit 1600.

The software processing unit 1400 then refers to the variable representing the number of searches, and determines the number of searches (step S13).

If the number of searches is "0" ("0" in step S13), the software processing unit 1400 masks lower bits than the bit (the search start bit position) represented by the search variable in the index flags 2200. The software processing unit 1400 then writes the bit information, including the bit represented by the search variable among the index flags 2200, and the bits higher than the bit represented by the search variable, into the bit search support register 2300 (step S14). For example, in a case where the search start position represented by the search variable is the bit 4 of the index flags 2200, as shown in FIG. 13A, the software processing unit 1400 writes the bit information about the index flags 2200 having masked bits 0 through 3, which are lower than the bit 4, into the bit search support register 2300. In other words, the information about the bits 4 through 15 of the index flags 2200 is written into the bit search support register 2300.

The bit search unit 1600 obtains the bit information about the index flags 2200 written in the bit search support register 2300, and searches the bit positions of the index flags 2200 indicated by the obtained bit information for the bit position having a flag recorded therein. The bit search unit 1600 then writes the search result into the bit search status register 2400. In the example case shown in FIG. 13A, the information about the bit positions having a flag recorded therein among the bits 4 through 15 of the index flags 2200 is retrieved. The software processing unit 1400 then refers to the bit search status register 2400 storing the results of the search carried out by the bit search unit 1600, and determines the bit position of the index flag 2200 having the flag recorded therein.

In a case where the number of searches is 1 ("1" in step S13), the software processing unit 1400 masks the lower bits than the bit position represented by the search variable in the index flags 2200, and also masks the bit at the search start position in the index flags 2200 and the higher bits than the search start position. The software processing unit 1400 then writes the bit information about the masked index flags 2200 into the bit search support register 2300 (step S15).

As the search of the bit at the search start position and the search of the higher bits than the search start position have been performed when the number of searches is "0", a search of the lower bits than the search start position is performed this time.

In a case where the search start position is the bit 4, and the bit position represented by the search variable in the index flags 2200 is the bit 1, for example, the software processing unit 1400 masks the higher bits (the bits 4 through 15) than the bit 4 and the lower bits (the bit 0) than the bit position (the bit 1) represented by the search variable in the index flags 2200, as shown in FIG. 13B. The bit search unit 1600 obtains the bit information about the index flags 2200 written in the bit search support register 2300. The bit search unit 1600 then detects the bit position having the flag recorded therein among the bit positions of the index flags 2200 indicated by the obtained bit information. The bit search unit 1600 writes the search result into the bit search status register 2400.

In a case where the number of searches is 2 ("2" in step S13), the software processing unit 1400 ends this operation.

The software processing unit 1400 then refers to the bit search status register 2400, and determines whether the index flags 2200 include a bit having "1" recorded therein (step S16).

In a case where the bit position information about the index flags 2200 determined to have "1" recorded therein is not recorded in the bit search status register 2400 ("yes" in step S16), the software processing unit 1400 initializes the search variable (step S18). The software processing unit 1400 then increments the number of searches by "1" (step S19), and causes the bit search unit 1600 to carry out the next search (step S13).

In a case where the bit position information about the index flags 2200 determined to have "1" recorded therein is recorded in the bit search status register 2400 ("no" in step S16), the software processing unit 1400 searches the data update flags 2100 (step S17). The searching operation to be performed on the data update flags 2100 will be described later, with reference to the flowchart shown in FIG. 12.

When the search of the data update flags 2100 ends, the software processing unit 1400 refers to the bit search status register 2400, and determines whether there is a data update flag 2100 having a flag recorded therein (step S20). If there is not a data update flag 2100 having a flag recorded therein, or there is not an ID-based buffer 1501 storing frame data ("no" in step S20), the operation returns to step S13, and a search of the index flags 2200 is again carried out. If a given number of ID-based buffers storing frame data are detected ("yes" in step S20), the search variable is stored at the search start position (step S21).

Referring now to FIGS. 13C and 13D, a search of the data updated flags 2100 to be carried out by the bit search unit 1600 is briefly described, before the operation to be performed by the software processing unit 1400 to cause the bit search unit 1600 to search the data update flags 2100 is described.

In a first-time search, the bit search unit 1600 carries out a bit search, starting from S at the upper right corner (0, 0) shown in FIG. 13C. The bit search unit 1600 then searches a zone A located on the right side of S from right to left. After ending the search of the zone A, the bit search unit 1600 searches a zone B shown in FIG. 13C from right to left, from top down.

For example, a flag is recorded on the fourth row and the fourth column in the matrix (the storage area for the data update flags) shown in FIG. 13C. The bit search unit 1600 detects the bit on the fourth row and the fourth column having the recorded flag (the bit G shown in FIG. 13C). The bit search unit 1600 then changes the next search start position to the position of the bit (G) having the flag recorded therein (the bit on the fourth row and the fourth column in FIG. 13C) (or changes the bit position represented by the search variable). The search is then ended.

In a second-time search, the bit search unit 1600 searches a zone C located on the left side of the previous search end position (the bit on the row 4 and column 4 in FIG. 13D) from right to left, as shown in FIG. 13D.

After ending the search of the zone C, the bit search unit 1600 searches a zone D shown in FIG. 13D, from right to left, from top down. After ending the search of the zone D, the bit search unit 1600 searches a zone E from right to left, from top down.

Lastly, the bit search unit 1600 searches a zone F located on the right side of the search start position (the bit on the row 4 and column 4 in FIG. 13D) from right to left. If a bit having a flag recorded therein is detected during the search, the bit search unit 1600 changes the next search start position to the position of the detected bit having the flag recorded therein, and ends the searching operation.

Referring now to the flowchart shown in FIG. 12, the procedures to be carried out by the software processing unit 1400 to cause the bit search unit 1600 to search the data update flags 2100 are described.

First, the software processing unit 1400 determines whether the position of a bit determined to have a flag recorded therein (having "1" recorded therein) by the bit search unit 1600 among the index flags 2200 is the same as the position of the bit represented by the search variable in the index flags 2200 (step S31). In other words, the software processing unit 1400 determines whether the search variable represents the position of the bit determined to have "1" recorded therein by the bit search unit 1600 among the index flags 2200.

In a case where the search variable representing the bit position in the index flags 2200 is the bit 4 in a search operation performed by the bit search unit 1600 on the index flags 2200, for example, the software processing unit 1400 writes the bit information about the index flags 2200 having masked bits 0 through 3 into the bit search support register 2300, as described above. At this point, the result of the search performed by the bit search unit 1600 may indicate that "1" is recorded in the bit 4 represented by the search variable, or "1" is recorded one of the bits 5 through 15, which are the higher bits than the bit 4, or "1" is not recorded in any of the bits 4 through 15.

If the search result indicates that "1" is recorded in the bit 4, the result of the search carried out by the bit search unit 1600 on the index flags 2200 matches the position of the bit represented by the search variable in the index flags 2200. If the search result indicates that "1" is recorded in one of the bits 5 through 15, the result of the search carried out by the bit search unit 1600 on the index flags 2200 does not match the position of the bit represented by the search variable in the index flags 2200.

If the search variable represents the position of the bit determined to have "1" recorded therein by the bit search unit 1600 in the index flags 2200 ("yes" in step S31), the software processing unit 1400 moves on to step S32.

In step S32, the software processing unit 1400 determines whether the position of the bit determined to have "1" set thereto by the bit search unit 1600 in the index flags 2200 is on the search start row in the data update flags 2100, and whether the number of searches is 0.

Figure 14A:
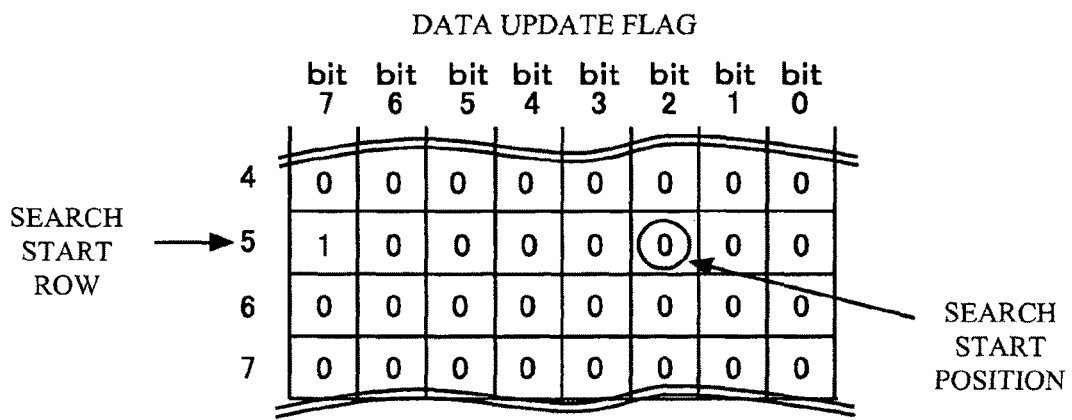
FIG. 14A shows the search start position and the search start row in the data update flags.

In a case where the software processing unit 1400 determines in step S31 that the search variable represents the position of the bit determined to have "1" recorded therein by the bit search unit 1600 in the index flags 2200, the information about the bit position determined to have "1" set thereto by the bit search unit 1600 in the index flags 2200 matches the search start row in the data update flags 2100. In such a case, a search might be started from a bit (the bit 2 in the example shown in FIG. 14A) in the middle of the search start row in the data update flags 2100, as shown in FIG. 14A. Since the search is started from the previous search end position, the search might be started from a bit in the middle of the search start row. Therefore, the determining procedure of step S32 is carried out.

Figure 14B:
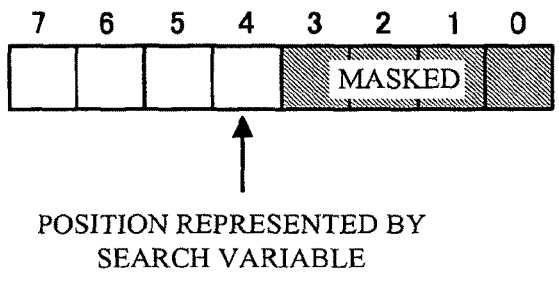
FIG. 14B shows the bit information to be written into the bit search support register during the first-time data update flag search.
Figure 14C:
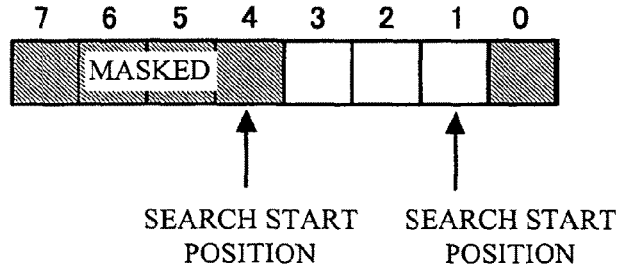
FIG. 14C shows the bit information to be written into the bit search support register during the second-time data update flag search.

In a case where the determination result of step S32 is "yes", or in the first-time search carried out on the data update flags 2100, the software processing unit 1400 writes the bit information including the masked bits lower than the position of the bit represented by the search variable among the data update flags 2100, as shown in FIG. 14B. The software processing unit 1400 writes the bit information into the bit search support register 2300 (step S34). Here, the search variable represents the search position among the data update flags 2100. In a case where the determination result of step S32 is "no", the software processing unit 1400 masks the lower bits than the position of the bit represented by the search variable in the data update flags 2100, and also masks the bit located at the search start position in the data update flags 2100 and the higher bits than the search start position, as shown in FIG. 14C. The software processing unit 1400 then writes the bit information about the masked data update flags 2100 into the bit search support register 2300 (step S33).

The software processing unit 1400 then refers to the bit search status register 2400, and determines whether there is a bit having "1" set thereto among the data update flags 2100 (step S35).

In a case where the information about the bit position having "1" recorded therein among the data update flags 2100 is not recorded in the bit search status register 2400 ("yes" in step S35), the software processing unit 1400 changes the search variable representing the search position in the data update flags 2100 to the bit 0 (the top) in the data update flags 2100. Alternatively, the search variable representing the bit position in the index flags 2200 is changed to a bit located one row lower than the bit position processed in steps S33 and S34. For example, if the procedures of steps S33 and S34 are carried out on the third row in the data update flags 2100, the row to be processed is changed to the fourth row.

In a case where the search variable does not represent the position of the bit determined to have "1" recorded therein by the bit search unit 1600 in the index flags 2200 ("no" in step S31), the software processing unit 1400 moves on to step S40.

In step S40, the search variable does not represent the position of the bit determined to have "1" recorded therein by the bit search unit 1600 in the index flags 2200. Therefore, the software processing unit 1400 sets the position represented by the search variable at the position of the bit determined to have "1" recorded therein by the bit search unit 1600 in the index flags 2200 (step S40).

The software processing unit 1400 then writes the bit information into the bit search support register 2300 (step S41). Here, the bit information indicates the row represented by the search variable changed in step S40 in the data update flags 2100.

The bit search unit 1600 searches for the position of the bit having "1" recorded therein among the data update flags 2100, based on the bit information about the data update flags 2100 written in the bit search support register 2300. The bit search unit 1600 then stores the search result into the bit search status register 2400.

The software processing unit 1400 refers to the bit search status register 2400, and checks the result of the search carried out by the bit search unit 1600 on the data update flags 2100. If a bit having "1" recorded therein is detected from the data update flags 2100, the detected bit is set as the bit represented by the search variable in the data update flags 2100 (step S42).

The software processing unit 1400 then reads frame data from the memory area of the ID-based buffer represented by the search variable, and stores the frame data into the corresponding transmitting message box 1112B. The software processing unit 1400 changes the flag information about the corresponding data update flag 2100 from "1" to "0" (step S43).

The software processing unit 1400 shifts the position of the bit represented by the search variable to the next bit (step S44), and increments the value of a counter by "1" (step S45). The counter counts the number of times frame data is detected.

The software processing unit 1400 then determines whether the last memory area of the ID-based buffer 1501 has been searched (step S37). In a case where a search has been carried out on the last memory area of the ID-based buffer 1501 ("yes" in step S37), the software processing unit 1400 initializes the search variable (step S38), and increments the counter value representing the number of searches by "1" (step S39). In a case where a search has not been carried out on the last memory area of the ID-based buffer 1501 ("no" in step S37), the software processing unit 1400 repeats the procedures, starting from step S31.

As described above, the index flags 2200 collectively indicating the information about the bits in the data update flags 2100 are provided in this embodiment. After a search is carried out on the index flags 2200, a search is carried out on the corresponding data update flags. Accordingly, it is possible to efficiently search for the memory area of the ID-based buffer storing frame data.

Also, the flag information about the memory area storing frame data with a higher transmission priority level than the memory area storing frame data detected by the bit search unit 1600 is masked. Accordingly, an efficient search can be carried out, when leveled frame data is transmitted.

In an operation to search the frame data stored in the ID-based buffers 1501 and 1502 in transmission order, it is possible to use an indirect table and label values allotted to the frame data. The label values are information that is allotted to the frame data when the frame data is written into the transmission FIFOs 1331, 1333, 1335, and 1337 by the search engine unit 1310. Each of the label values retains the information about more than one bit.

Figure 15:
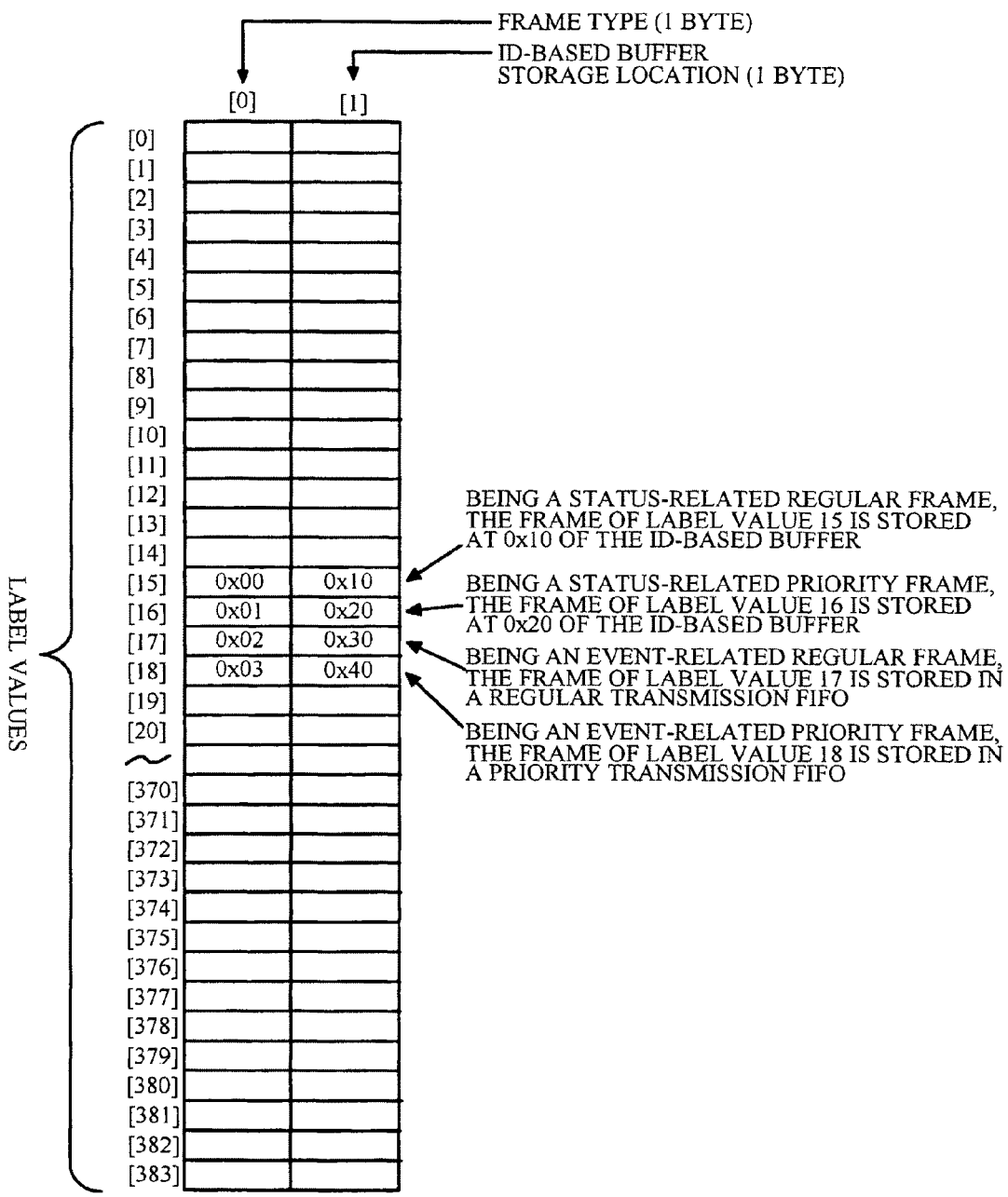
FIG. 15 shows an example of an indirect table.

The software processing unit 1400 refers to the indirect table, based on the label value allotted to the frame data. The software processing unit 1400 then determines the processing for the frame data. FIG. 15 shows an example of the indirect table. FIG. 16 shows the structure of frame data to be written into a transmission FIFO.

In the indirect table shown in FIG. 15, 1-byte information indicating the types of the frame data and 1-byte information indicating the storage location of the ID-based buffer are recorded based on each label value. For example, in the indirect table shown in FIG. 15, the frame data having the label value of 15 is status-related regular frame data, and is to be stored at [0x10] in the corresponding regular ID-based buffer. The frame data having the label value of 16 is status-related preferential frame data, and is to be stored at [0x20] in the corresponding preferential ID-based buffer. Each preferential ID-based buffer is an ID-based buffer that stores frame data to be preferentially transmitted, and each regular ID-based buffer is an ID-based buffer that stores frame data not to be preferentially transmitted. Each of the ID-based buffer 1501, 1502, . . . shown in FIG. 9 is either a preferential ID-based buffer or a regular ID-based buffer.

FIG. 17A shows an example of 1-byte information indicating the frame type recorded in the indirect table of FIG. 15. FIG. 17B shows an example of 1-byte information indicating the storage location in the corresponding ID-based buffer also recorded in the indirect table.

The 1-byte information indicating the types of frame data has the bit 0 that shows whether the frame data is regular frame data or preferential frame data, and has the bit 1 that shows whether the frame data is status-related frame data or event-related frame data, as shown in FIG. 17A. The status-related frame data is leveled in transmission order, and is then transmitted. The event-related frame data is stored in the transmitting message box 1112B in the same order as the frame data is stored in the transmission FIFO. The event-related frame data is then transmitted.

The ID-based buffer storage location information shown in FIG. 17B indicates the location of the storage into the ID-based buffer. Since the event-related frame data is not stored in the ID-based buffer, the ID-based buffer storage location information is not referred to, if the frame data type is an event-related type.

Although a few preferred embodiments of the present invention have been shown and described, it would be appreciated by those skilled in the art that changes may be made in these embodiments without departing from the principles and spirit of the invention, the scope of which is defined in the claims and their equivalents.

For example, the data search device (the software processing unit 1400) in a communication apparatus (the gateway device 1000) has been described in the above embodiment. However, it is possible to apply the present invention to a device other than a communication apparatus, such as a display device.

The present invention is based on Japanese Patent Application No. 2008-039432 filed on Feb. 20, 2008 and Japanese Patent Application No. 2009-036036 filed on Feb. 19, 2009, the entire disclosure of which is hereby incorporated by reference.

What is claimed is:

1. A communication apparatus that detects a memory area that stores data to be transmitted from a memory unit having memory areas defined by IDs (identifier numbers) allotted to the data, and transmits the data extracted by detecting the memory area, the communication apparatus comprising:

a plurality of first flags, wherein one of the first flags is provided for each of the memory areas of the memory unit, and indicates whether data in each corresponding memory area is updated;

a second flag that is provided for each of a plurality of groups, each group consisting of a predetermined number of the first flags, and indicates a data update status when at least one set of data represented by one of the first flags in the corresponding group is in an updated state;

a flag memory part that stores the first flags and the second flag;

a flag update processing part that detects an area in the flag memory part that stores the corresponding first flags and the second flag under the condition that the memory unit stores the data to be transmitted, updates a status of each of the first flags in the detected memory area, and updates a status of the second flag in the detected memory area under the condition that the status of the second flag needs to be updated;

a data search processing part that executes a search process extracting the data to be transmitted from the memory area by searching for the corresponding first flags after detecting the second flag, and sets the data to be transmitted in a message box; and a transmission processing part that transmits the data set in the message box;

wherein:

the data search processing part executes the search process at a predetermined cycle and does not execute the search process if there is not a space area in the message box to store the data to be transmitted;

the memory area in the flag memory part storing the first flags is formed in a matrix;

a number of columns of the matrix is a number of the form $2^n$ (where n is an integer); and the flag update processing part detects the area in the flag memory part by using an ID shown by a binary number allotted to the data to be transmitted that indicates the area in the flag memory part that stores the first flags and the second flag.

2. The communication apparatus as claimed in claim 1, wherein the search control unit uses hardware that detects the second flag indicating the data update status and then searches for the corresponding first flags in order of data transmission, and detects the memory area of the memory unit having the first flags indicating the data update status and storing the data to be transmitted.

3. A gateway device comprising:

a routing part that searches for a communication channel for transferring frame data received from another communication channel;

a transmission buffer that stores the frame data processed by the routing part and has divided memory areas respectively provided for IDs of the frame data;

a flag memory part that stores a first flag that is provided for each of the divided memory areas of the transmission buffer and indicates whether data in a corresponding one of the divided memory areas has been updated, and a second flag that is provided for each group having a given number of first flags and indicates, when at least one of the first flags in one group indicates that the data has been updated, an updated state of the data;

a flag update processing part that detects an area in the flag memory part that stores the corresponding first flags and the second flag under the condition that the memory unit stores the data to be transmitted, updates a status of each of the first flags in the detected memory area, and updates a status of the second flag in the detected memory area under the condition that the status of the second flag needs to be updated;

a data memory processing part that stores the frame data processed by the routing part in the transmission buffer and updates the first and second flags stored in the flag memory part;

a data search processing part that executes a search process extracting the frame data from the transmission buffer, by searching for the corresponding first flags after detecting the second flag and sets the frame data extracted in a message box; and a transmission processing part that transmits the frame data set in the message box to the communication channel;

wherein:

the data search processing part executes the search process at a predetermined cycle and does not execute the search process if there is not a space area to store the frame data in the message box;

the memory area in the flag memory part storing the first flags is formed in a matrix;

a number of columns of the matrix is a number of the form $2^n$ (where n is an integer); and the flag update processing part detects the area in the flag memory part by using an ID shown by a binary number allotted to the data to be transmitted that indicates the area in the flag memory part that stores the first flags and the second flag.

4. A gateway device comprising:

a routing part that searches for a communication channel for transferring frame data received from another communication channel and stores the frame data in a transmission FIFO (First In First Out) corresponding to the communication channel searched for;

a transmission buffer that stores the frame data read from the transmission FIFO and has divided memory areas respectively provided for IDs of the frame data;

a flag memory part that stores first flags that are provided for each of the divided memory areas of the transmission buffer and indicates whether data in a corresponding one of the divided memory areas has been updated, and a second flag that is provided for each group having a given number of the first flags and indicates, when at least one of the first flags in one group indicates that the data has been updated, an updated state of the data;

a flag update processing part that detects an area in the flag memory part that stores the corresponding first flags and the second flag under the condition that the memory unit stores the data to be transmitted, updates a status of each of the first flags in the detected memory area, and updates a status of the second flag in the detected memory area under the condition that the status of the second flag needs to be updated;

a data memory processing part that stores the frame data read from the transmission FIFO in the transmission buffer and updates the first flags and the second flag stored in the flag memory part;

a data search processing part that executes a search process extracting the frame data from the transmission buffer, by searching for the corresponding first flags after detecting the second flag, and sets the frame data extracted in a message box; and a transmission processing part that transmits the frame data set in the message box to the communication channel;

wherein:

the data search processing part executes the search process at a predetermined cycle and does not execute the search process if there is not a space area to store the frame data in the message box;

the memory area in the flag memory part storing the first flags is formed in a matrix;

a number of columns of the matrix is a number of the form $2^n$ (where n is an integer); and the flag update processing part detects the area in the flag memory part by using an ID shown by a binary number allotted to the data to be transmitted that indicates the area in the flag memory part that stores the first flags and the second flag.

5. The gateway device as claimed in claim 4, further comprising:

a data determining part that reads the frame data that is stored in a transmission FIFO and then determines whether the frame data is to be transmitted with a leveling processing that rearranges an order of transmitting the frame data based on additional information that is added to the frame data, or is to be transmitted without the leveling process; and a data updating part that updates the corresponding first flags and the second flag that are stored in the flag memory part as to the divided memory areas of the transmission buffer after the transmission buffer stores the frame data to be transmitted with the leveling process;

wherein:

the data search processing part includes a first data search processing part that sets the frame data to be transmitted without the leveling process in the message box with which the communication channel is provided, and a second data search processing part that searches for the corresponding first flags after detecting the second flag that the flag memory part stores by a bit search unit, executes the leveling process based on information obtained from the bit search unit, and sets the frame data with the leveling process in the message box.

* * * * *